(12) United States Patent
Podhajny et al.

(10) Patent No.: US 9,545,128 B2
(45) Date of Patent: Jan. 17, 2017

(54) ARTICLE OF FOOTWEAR INCORPORATING A KNITTED COMPONENT WITH TENSILE STRAND

(71) Applicant: NIKE, Inc., Beaverton, OR (US)

(72) Inventors: Daniel A. Podhajny, Beaverton, OR (US); Chung-Ming Chang, Yun-Lin (TW); Ya-Fang Chen, Chang-Hua (TW); Pei-Ju Su, Miao-Li (TW)

(73) Assignee: NIKE, Inc., Beaverton, OR (US)

( * ) Notice: Subject to any disclaimer, the term of this patent is extended or adjusted under 35 U.S.C. 154(b) by 215 days.

(21) Appl. No.: 13/783,782

(22) Filed: Mar. 4, 2013

(65) Prior Publication Data
US 2014/0245632 A1   Sep. 4, 2014

(51) Int. Cl.
| | | |
|---|---|---|
| A43B 1/04 | (2006.01) |
| A43B 23/02 | (2006.01) |
| A43C 1/04 | (2006.01) |
| D04B 1/12 | (2006.01) |

(52) U.S. Cl.
CPC ............ *A43B 1/04* (2013.01); *A43B 23/0235* (2013.01); *A43B 23/0245* (2013.01); *A43B 23/0265* (2013.01); *A43B 23/0275* (2013.01); *A43C 1/04* (2013.01); *D04B 1/123* (2013.01); *D10B 2403/0213* (2013.01); *D10B 2403/02411* (2013.01); *D10B 2403/032* (2013.01); *D10B 2501/043* (2013.01)

(58) Field of Classification Search
CPC . A43B 23/0235; A43B 23/04; A43B 23/0245; A43B 23/042; A43B 23/0275; A43C 1/04; A43C 11/14; A43C 1/003; D10B 2501/043; D04B 1/123
USPC ...................................... 36/47, 50.1; 66/185
See application file for complete search history.

(56) References Cited

U.S. PATENT DOCUMENTS

| | | | |
|---|---|---|---|
| 2,147,197 | A | 2/1939 | Glidden |
| 2,314,098 | A | 3/1943 | McDonald |
| 2,343,390 | A | 3/1944 | Ushakoff |
| 2,440,393 | A | 4/1948 | Clark |
| 2,495,984 | A | 1/1950 | Roy |
| 2,569,764 | A | 10/1951 | Jonas |
| 2,608,078 | A | 8/1952 | Anderson |

(Continued)

FOREIGN PATENT DOCUMENTS

| | | |
|---|---|---|
| CN | 101562999 | 10/2009 |
| CN | 102271548 A | 12/2011 |

(Continued)

OTHER PUBLICATIONS

Letter from Bruce Huffa dated Dec. 23, 2013 (71 Pages).

(Continued)

*Primary Examiner* — Khoa Huynh
*Assistant Examiner* — Katharine Gracz
(74) *Attorney, Agent, or Firm* — Brinks Gilson & Lione

(57) ABSTRACT

An upper for an article of footwear is configured to be connected to a sole structure. The upper includes a knitted component having a base portion that is configured to be disposed adjacent the sole structure. The base portion defines an interior surface and an exterior surface of the knitted component. The base portion defines a base portion passage between the interior surface and the exterior surface. Also, the upper includes a tensile strand that extends through the base portion passage.

18 Claims, 20 Drawing Sheets

(56) References Cited

U.S. PATENT DOCUMENTS

| | | | |
|---|---|---|---|
| 2,641,004 A | 6/1953 | Whiting et al. | |
| 3,583,081 A | 6/1971 | Hayashi | |
| 3,672,187 A * | 6/1972 | Simpson | D04B 21/14 66/192 |
| 4,003,224 A * | 1/1977 | Odham | D04B 21/18 66/193 |
| 4,447,967 A | 5/1984 | Zaino | |
| 4,592,154 A | 6/1986 | Oatman | |
| 4,654,985 A | 4/1987 | Chalmers | |
| 4,750,339 A | 6/1988 | Simpson et al. | |
| 4,756,098 A | 7/1988 | Boggia | |
| 4,785,558 A | 11/1988 | Shiomura | |
| 4,811,503 A | 3/1989 | Iwama | |
| 4,813,158 A | 3/1989 | Brown | |
| 5,291,671 A | 3/1994 | Caberlotto et al. | |
| 5,345,638 A | 9/1994 | Nishida | |
| 5,371,957 A | 12/1994 | Gaudio | |
| 5,678,329 A | 10/1997 | Griffin et al. | |
| 5,692,319 A | 12/1997 | Parker et al. | |
| 5,755,044 A | 5/1998 | Veylupek | |
| 6,029,376 A * | 2/2000 | Cass | 36/50.1 |
| 6,032,387 A | 3/2000 | Johnson | |
| 6,052,921 A | 4/2000 | Oreck | |
| 6,074,965 A * | 6/2000 | Bodenschatz | A61F 13/00038 428/295.4 |
| 6,286,233 B1 | 9/2001 | Gaither | |
| 6,333,105 B1 | 12/2001 | Tanaka et al. | |
| 6,378,230 B1 | 4/2002 | Rotem et al. | |
| 6,598,322 B2 | 7/2003 | Jacques et al. | |
| 6,772,541 B1 | 8/2004 | Ritter | |
| 7,134,224 B2 | 11/2006 | Elkington et al. | |
| D553,842 S | 10/2007 | Paz | |
| 7,343,701 B2 | 3/2008 | Pare et al. | |
| 7,562,470 B2 | 7/2009 | Keen | |
| 7,568,298 B2 | 8/2009 | Kerns | |
| 7,631,440 B2 * | 12/2009 | Keen | A43B 1/14 36/50.1 |
| 7,793,435 B1 | 9/2010 | Ruth | |
| 8,006,410 B2 | 8/2011 | Romboli et al. | |
| 8,074,379 B2 | 12/2011 | Robinson et al. | |
| 8,151,490 B2 | 4/2012 | Sokolowski | |
| 8,230,618 B2 | 7/2012 | Bruce et al. | |
| 2002/0148258 A1 | 10/2002 | Cole et al. | |
| 2004/0181972 A1* | 9/2004 | Csorba | 36/50.1 |
| 2005/0284000 A1 | 12/2005 | Kerns | |
| 2006/0048413 A1 | 3/2006 | Sokolowski et al. | |
| 2008/0110049 A1 | 5/2008 | Sokolowski et al. | |
| 2009/0126231 A1 | 5/2009 | Malmivaara | |
| 2010/0077634 A1 | 4/2010 | Bell | |
| 2010/0154256 A1 | 6/2010 | Dua | |
| 2011/0197475 A1 | 8/2011 | Weidl et al. | |
| 2011/0258876 A1 | 10/2011 | Baker et al. | |
| 2012/0023686 A1 | 2/2012 | Huffa et al. | |
| 2012/0118453 A1* | 5/2012 | Pax | B60C 9/18 152/151 |
| 2012/0131818 A1 | 5/2012 | Nishiwaki et al. | |
| 2012/0233882 A1 | 9/2012 | Huffa et al. | |
| 2012/0240428 A1 | 9/2012 | Knoll | |
| 2012/0255201 A1 | 10/2012 | Little | |
| 2012/0260526 A1 | 10/2012 | Smith et al. | |
| 2012/0318026 A1 | 12/2012 | Dua et al. | |

FOREIGN PATENT DOCUMENTS

| | | |
|---|---|---|
| CN | 202335387 | 7/2012 |
| DE | 1084173 | 6/1960 |
| DE | 19738433 | 4/1998 |
| DE | 19728848 | 1/1999 |
| EP | 0448714 | 10/1991 |
| EP | 0728860 | 8/1996 |
| EP | 0758693 | 2/1997 |
| EP | 1233091 | 8/2002 |
| FR | 2171172 | 9/1973 |
| FR | 2697727 | 10/1993 |
| GB | 538865 | 8/1941 |
| GB | 1603487 | 11/1981 |
| JP | H06113905 | 4/1994 |
| JP | H08109553 | 4/1996 |
| JP | 09065908 | 3/1997 |
| JP | H11302943 | 11/1999 |
| JP | 2007190351 | 8/2007 |
| NL | 7304678 | 10/1974 |
| WO | 9003744 | 4/1990 |
| WO | 0032861 | 6/2000 |
| WO | 0231247 | 4/2002 |

OTHER PUBLICATIONS

International Search Report and Written Opinion in connection with International Application No. PCT/US2014/019542, mailed Jun. 26, 2014.

International Search Report and Written Opinion in connection with International Application No. PCT/US2014/019548, mailed Jun. 26, 2014.

Declaration of Dr. Edward C. Frederick from the US Patent and Trademark Office Inter Partes Review of U.S. Pat. No. 7,347,011 (178 pp).

David J. Spencer, Knitting Technology: A Comprehensive Handbook and Practical Guide (Third ed., Woodhead Publishing Ltd. 2001) (413 pp).

Excerpt of Hannelore Eberle et al., Clothing Technology (Third English ed., Beuth-Verlag GmnH 2002) (book cover and back; pp. 2-3, 83).

Office Action for Taiwanese patent application 103107278 issued Aug. 12, 2015, 22 pgs. including English translation.

Office Action, and English language translation thereof, in corresponding Chinese Application No. 201480025070.0, dated May 31, 2016, 21 pages.

* cited by examiner

ARTICLE OF FOOTWEAR INCORPORATING A KNITTED COMPONENT WITH TENSILE STRAND

FIELD

The present disclosure relates to an article of footwear and, more particularly, relates to an article of footwear incorporating a knitted component with a tensile strand.

BACKGROUND

This section provides background information related to the present disclosure which is not necessarily prior art.

Conventional articles of footwear generally include two primary elements, an upper and a sole structure. The upper is secured to the sole structure and forms a void on the interior of the footwear for comfortably and securely receiving a foot. The sole structure is secured to a lower area of the upper, thereby being positioned between the upper and the ground. In athletic footwear, for example, the sole structure may include a midsole and an outsole. The midsole often includes a polymer foam material that attenuates ground reaction forces to lessen stresses upon the foot and leg during walking, running, and other ambulatory activities. Additionally, the midsole may include fluid-filled chambers, plates, moderators, or other elements that further attenuate forces, enhance stability, or influence the motions of the foot. The outsole is secured to a lower surface of the midsole and provides a ground-engaging portion of the sole structure formed from a durable and wear-resistant material, such as rubber. The sole structure may also include a sockliner positioned within the void and proximal a lower surface of the foot to enhance footwear comfort.

The upper generally extends over the instep and toe areas of the foot, along the medial and lateral sides of the foot and around the heel area of the foot. In some articles of footwear, such as basketball footwear and boots, the upper may extend upward and around the ankle to provide support or protection for the ankle. Access to the void on the interior of the upper is generally provided by an ankle opening in a heel region of the footwear. A lacing system is often incorporated into the upper to adjust the fit of the upper, thereby permitting entry and removal of the foot from the void within the upper. The lacing system also permits the wearer to modify certain dimensions of the upper, particularly girth, to accommodate feet with varying dimensions. In addition, the upper may include a tongue that extends under the lacing system to enhance adjustability of the footwear, and the upper may incorporate a heel counter to limit movement of the heel.

A variety of material elements (e.g., textiles, polymer foam, polymer sheets, leather, synthetic leather) are conventionally utilized in manufacturing the upper. In athletic footwear, for example, the upper may have multiple layers that each include a variety of joined material elements. As examples, the material elements may be selected to impart stretch-resistance, wear-resistance, flexibility, air-permeability, compressibility, comfort, and moisture-wicking to different areas of the upper. In order to impart the different properties to different areas of the upper, material elements are often cut to desired shapes and then joined together, usually with stitching or adhesive bonding. Moreover, the material elements are often joined in a layered configuration to impart multiple properties to the same areas. As the number and type of material elements incorporated into the upper increases, the time and expense associated with transporting, stocking, cutting, and joining the material elements may also increase. Waste material from cutting and stitching processes also accumulates to a greater degree as the number and type of material elements incorporated into the upper increases. Moreover, uppers with a greater number of material elements may be more difficult to recycle than uppers formed from fewer types and numbers of material elements. By decreasing the number of material elements utilized in the upper, therefore, waste may be decreased while increasing the manufacturing efficiency and recyclability of the upper.

SUMMARY

This section provides a general summary of the disclosure, and is not a comprehensive disclosure of its full scope or all of its features.

An upper for an article of footwear that is configured to be connected to a sole structure is disclosed. The upper includes a knitted component having a base portion that is configured to be disposed adjacent the sole structure. The base portion defines an interior surface and an exterior surface of the knitted component. The base portion defines a base portion passage between the interior surface and the exterior surface. Also, the upper includes a tensile strand that extends through the base portion passage.

Additionally, an upper for an article of footwear is disclosed that is configured to be connected to a sole structure. The upper includes a knitted component having a base portion that is configured to be disposed adjacent the sole structure. The base portion has a first layer of knitted material that defines an interior surface of the base portion, a second layer of knitted material that defines an exterior surface of the base portion, and a plurality of spacer strands that extend between and provide spacing between the first layer and the second layer. A base portion passage is defined between the plurality of spacer strands. Moreover, a tensile strand extends through the base portion passage.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 5:
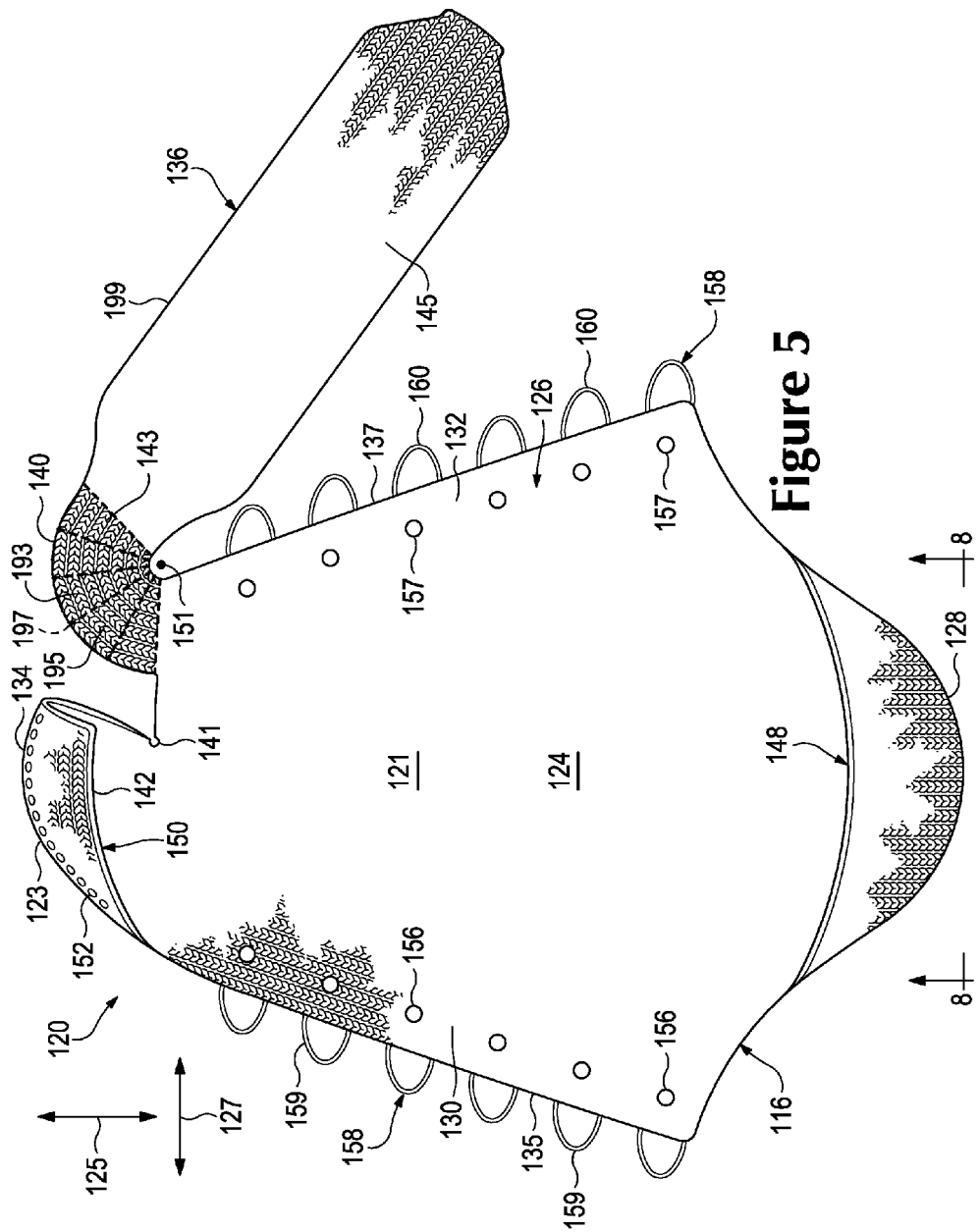
FIG. 5 is a top plan view of the knitted component of FIG. 4.
Figure 6:
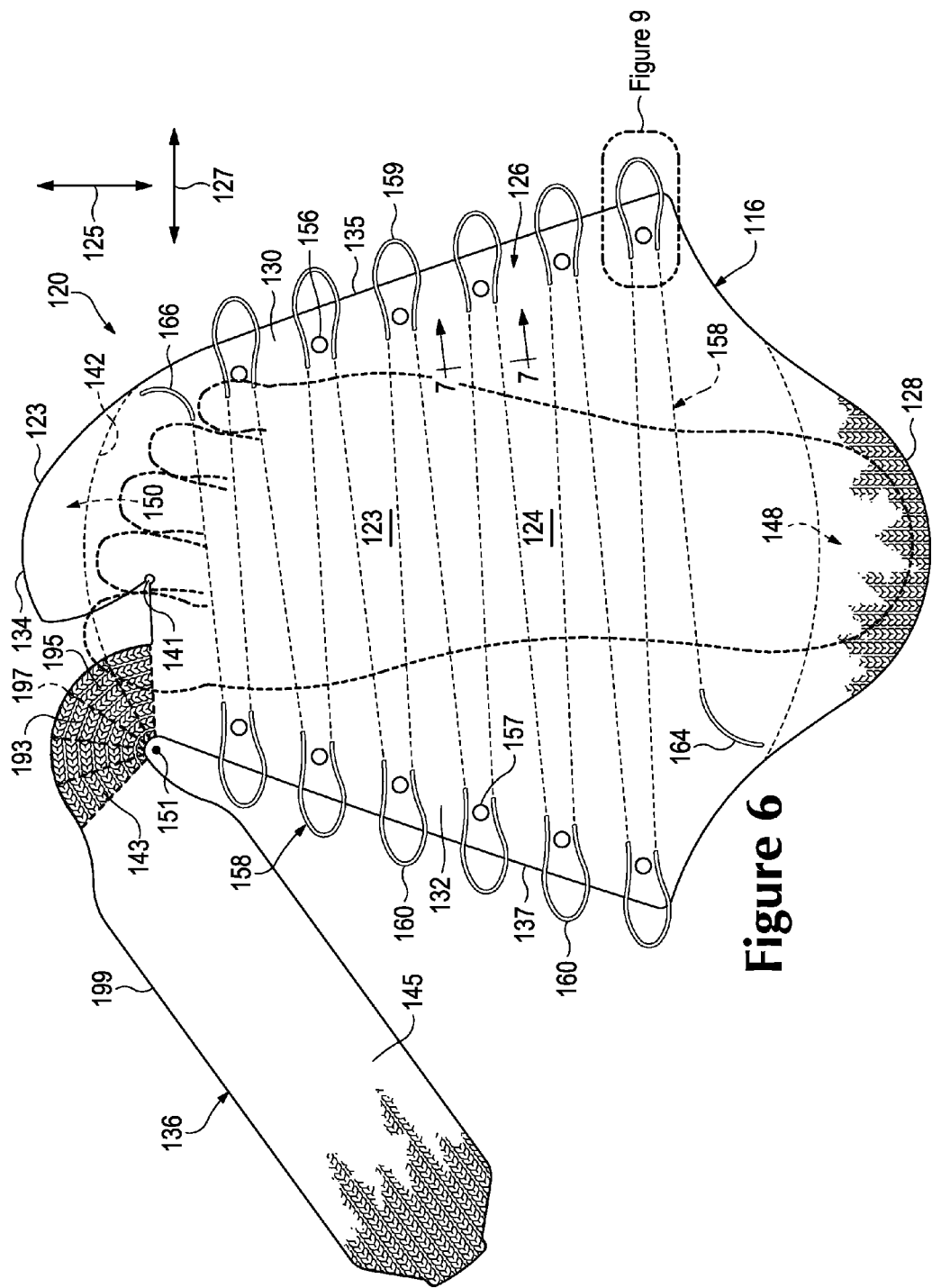
FIG. 6 is a bottom plan view of the knitted component of FIG. 4 with a footprint shown in phantom.
Figure 8:
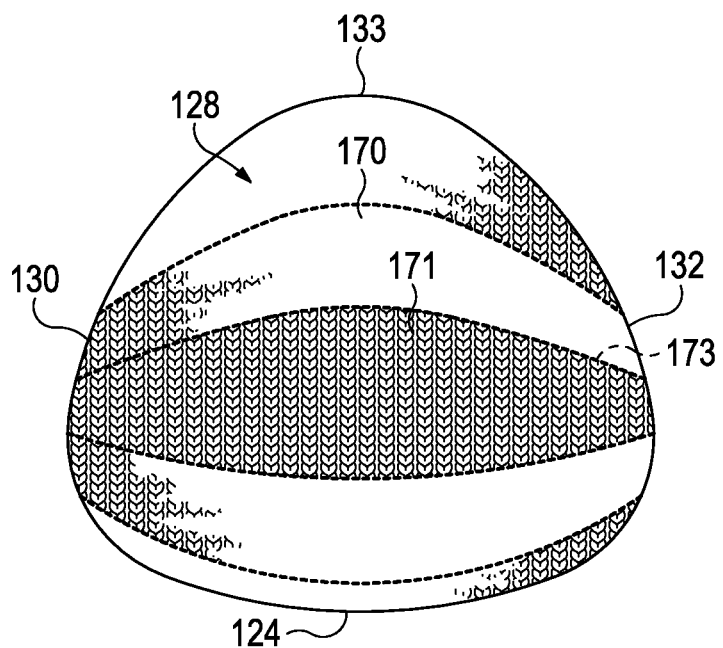
Figure 9:
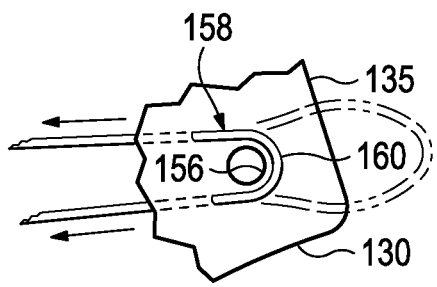
Figure 11:
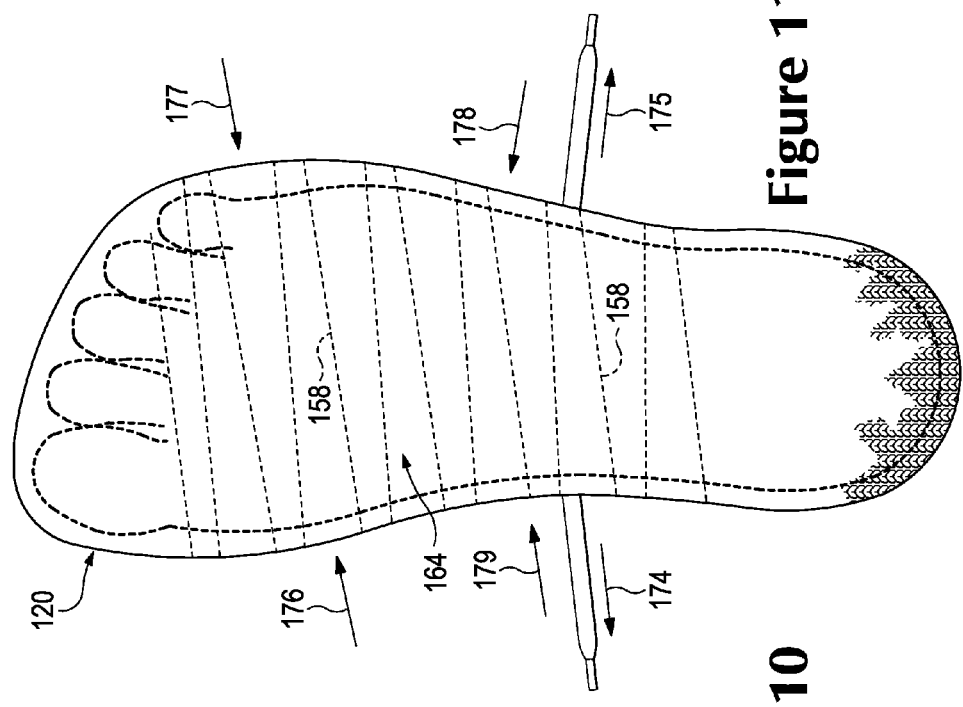
Figure 10:
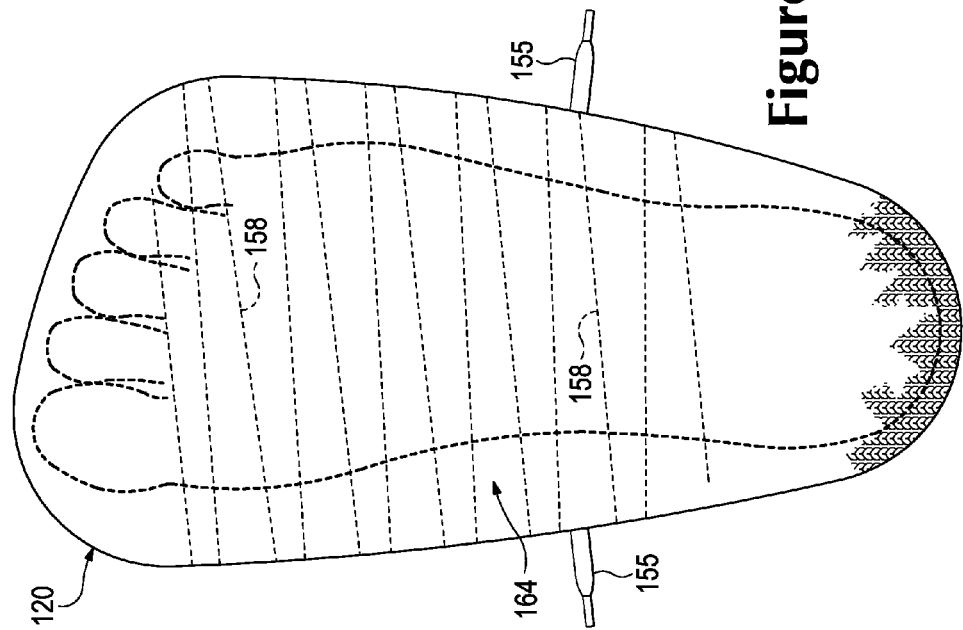
Figure 12:
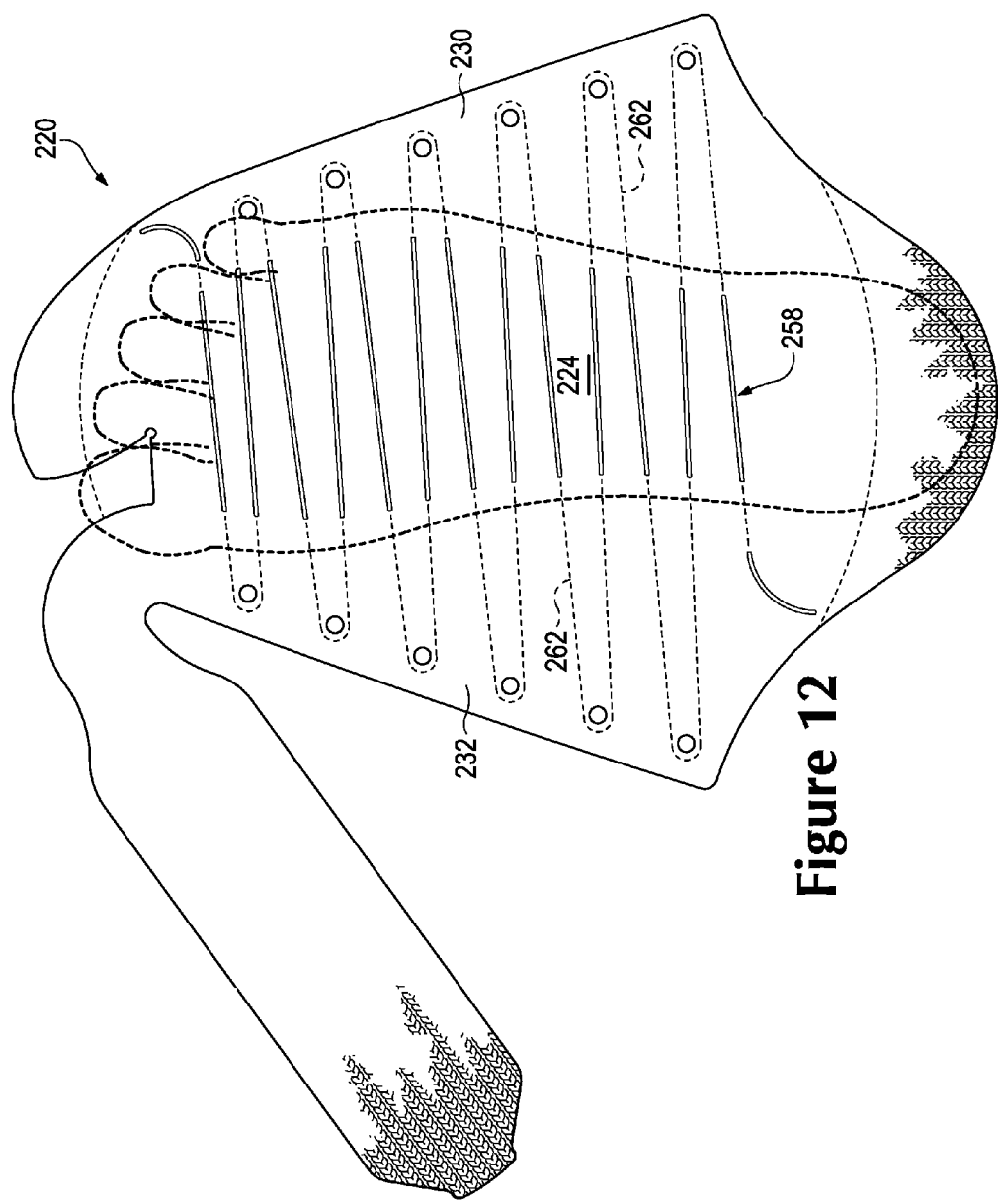
Figure 13:
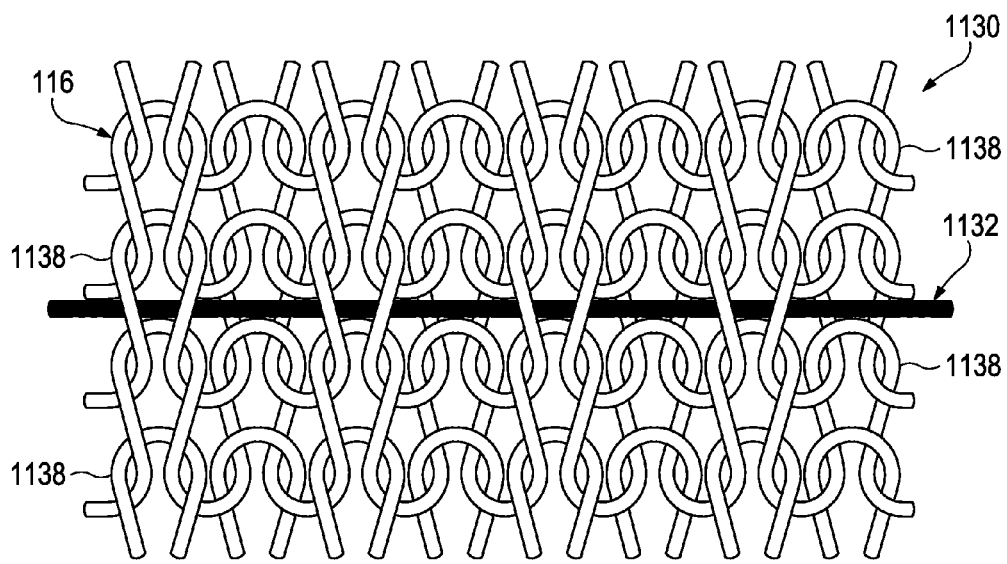
Figure 14:
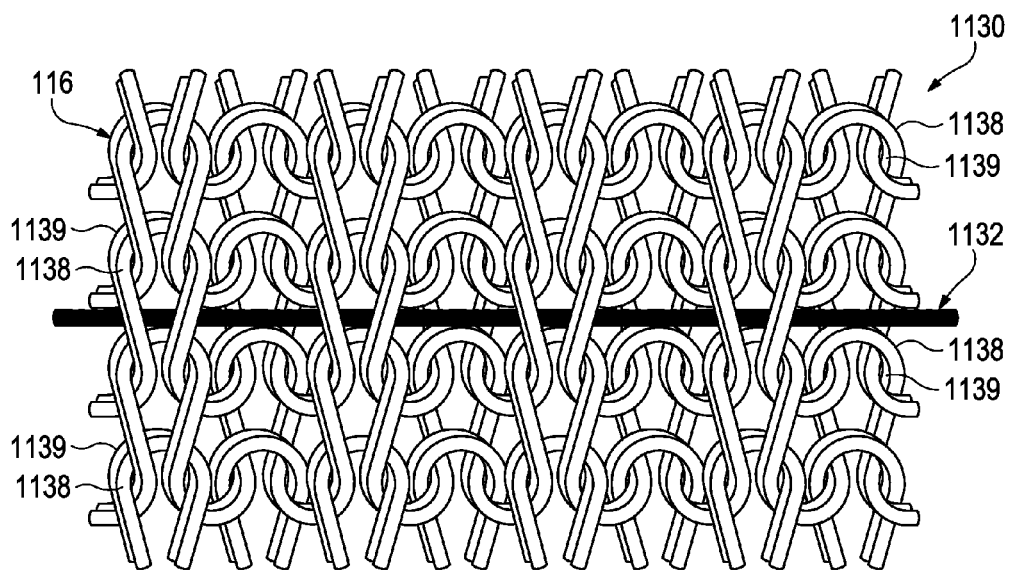
Figures 24, 25:
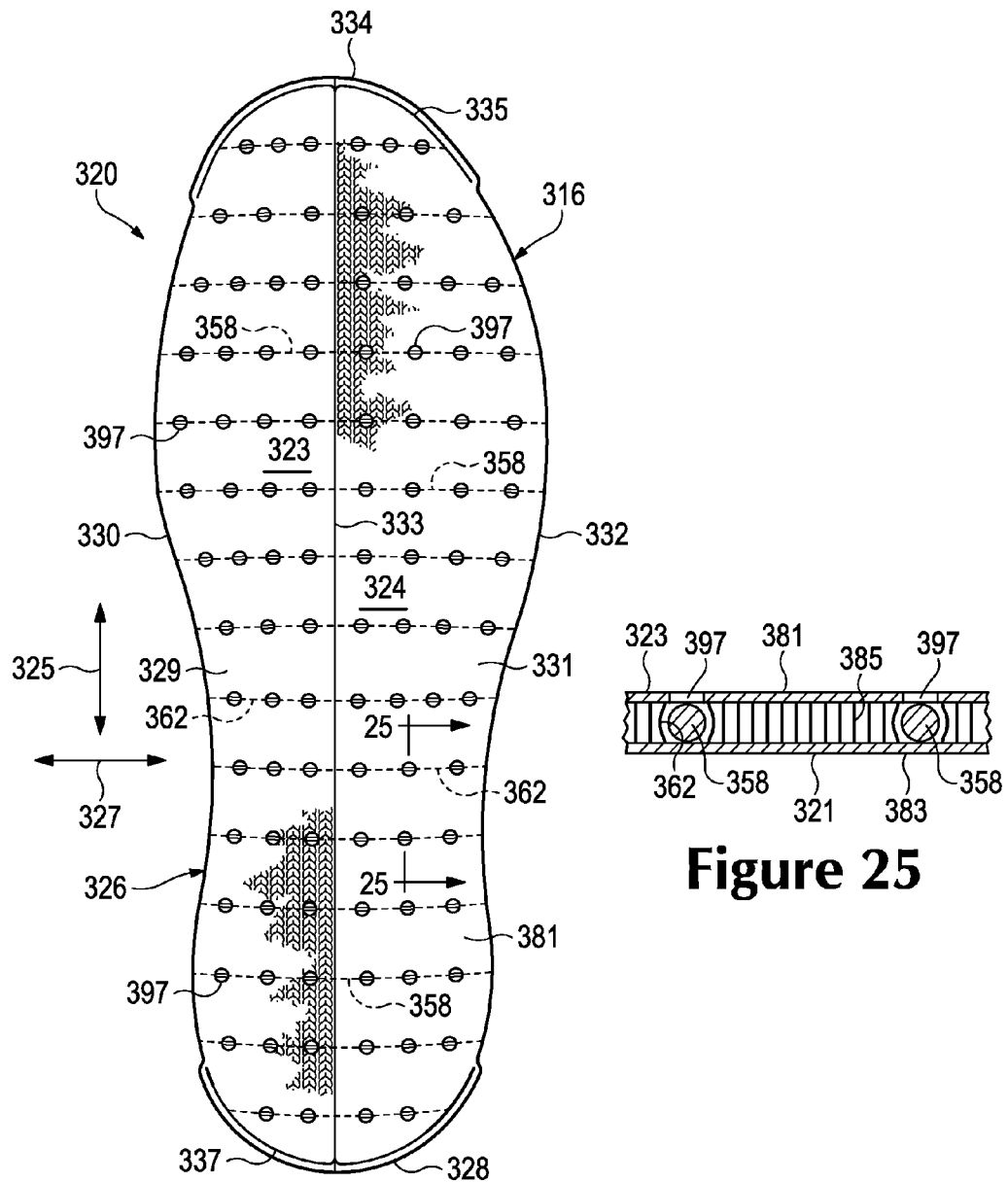

FIG. 8 a schematic view of a heel portion of the knitted component taken from the perspective of the line 8-8 of FIG. 5;

FIG. 9 is a detail view of a portion of the knitted component taken from FIG. 6;

FIGS. 10 and 11 are bottom plan views of the knitted component, wherein FIG. 10 shows the closure member in the unsecured position and FIG. 11 shows the closure member in the secured position;

FIG. 12 is a bottom view of a knitted component with inlaid strands according to additional embodiments of the present disclosure;

FIGS. 13 and 14 are schematic views of a unitary knit construction with inlaid strands;

FIGS. 15-23 are perspective schematic views of parts of a flat knitting machine shown during formation of a unitary knit construction with an inlaid strand;

FIG. 24 is a bottom view of a knitted component with tensile strands according to additional embodiments of the present disclosure; and FIG. 25 is a section view of the knitted component taken along the line 25-25 of FIG. 24.

Corresponding reference numerals indicate corresponding parts throughout the several views of the drawings.

DETAILED DESCRIPTION

Example embodiments will now be described more fully with reference to the accompanying drawings.

General Discussion of Article of Footwear

Figure 1:
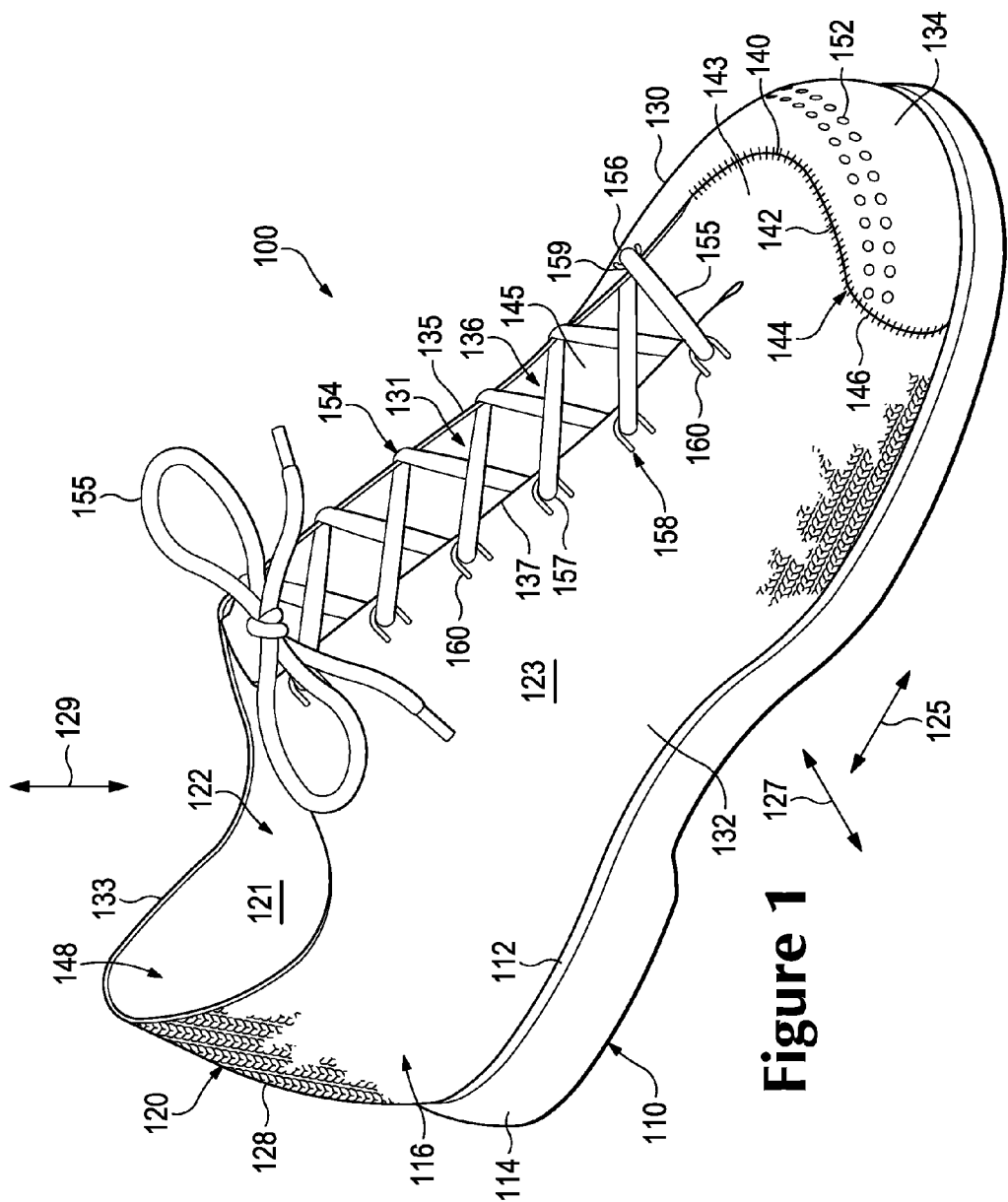
FIG. 1 is a perspective view of an article of footwear according to exemplary embodiments of the present disclosure.
Figure 2:
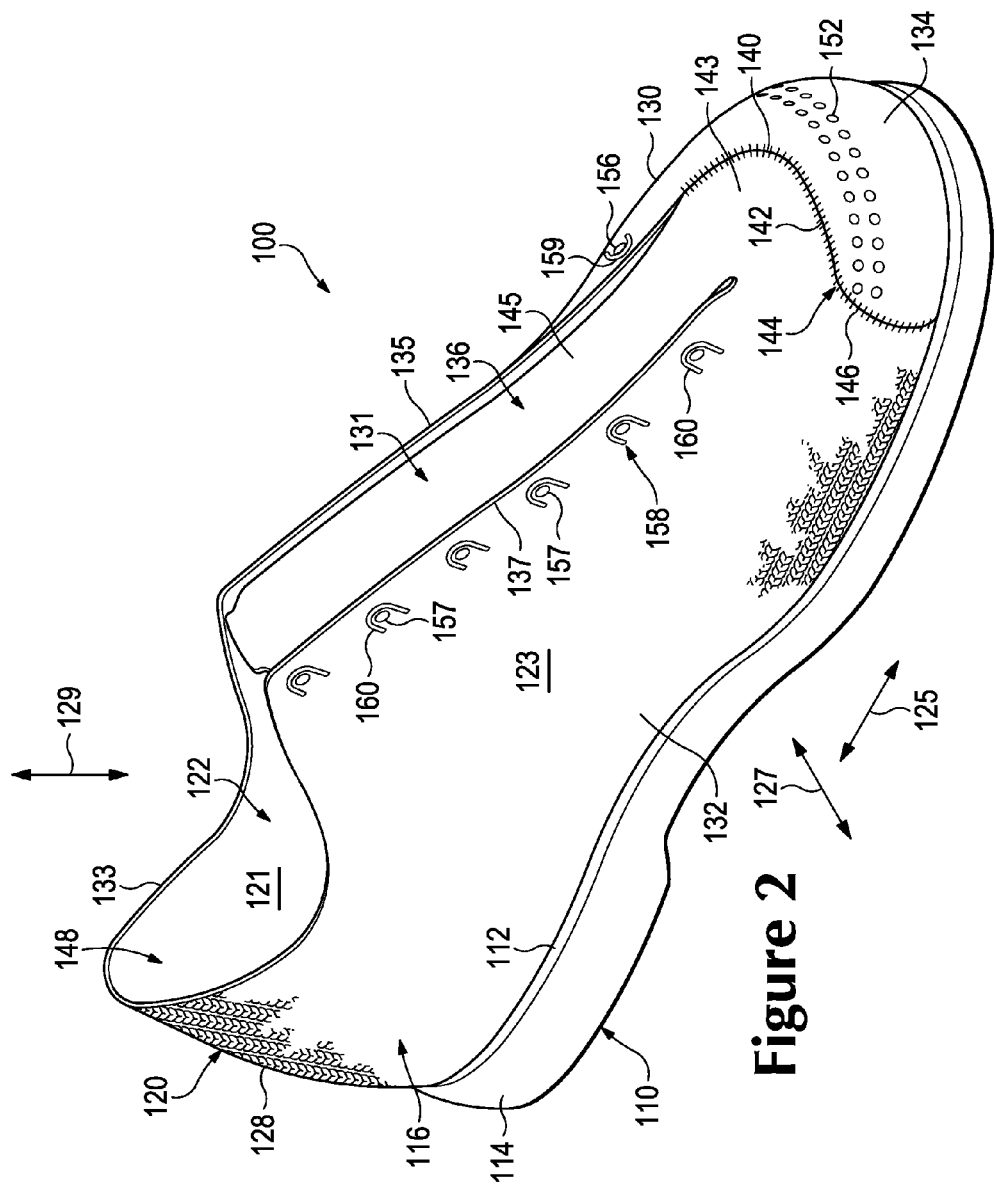
FIG. 2 is a perspective view of the article of footwear of FIG. 1 with a closure member removed.
Figure 3:
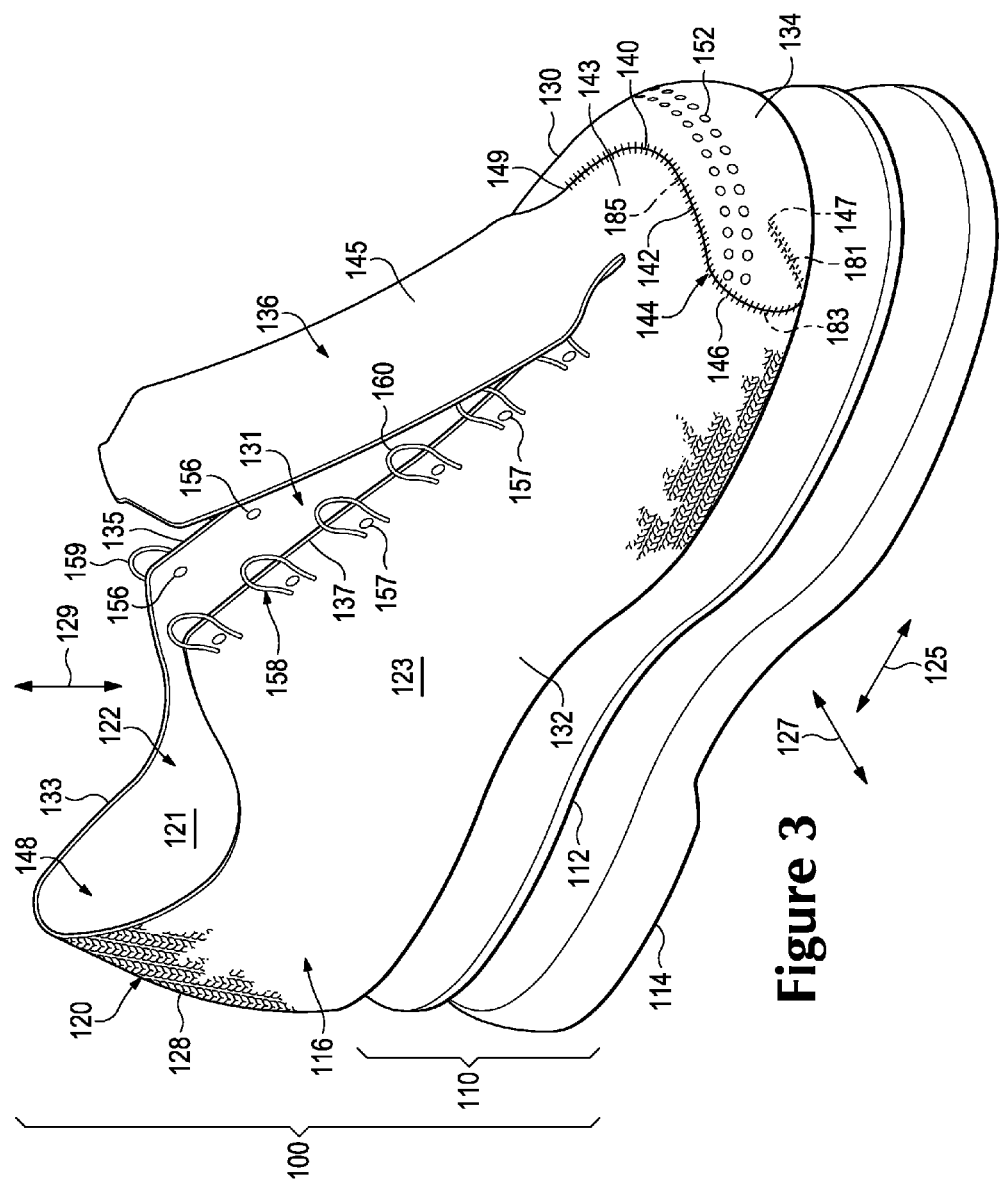
FIG. 3 is an exploded perspective view of the article of footwear of FIG. 2.

Referring initially to FIGS. 1-3, an article of footwear 100 is illustrated according to exemplary embodiments. The footwear 100 can generally include a sole structure 110 and an upper 120.

Sole structure 110 is secured to upper 120 and extends between the foot and the ground when footwear 100 is worn. The sole structure 110 can include a midsole 112 and an outsole 114 that are layered on each other. The midsole 112 can include a resiliently compressible material, fluid-filled bladders, and the like. As such, the midsole 112 can cushion the wearer's foot and attenuate impact and other forces when running, jumping, and the like. The outsole 114 can be secured to the midsole 112 and can include a wear resistant material, such as rubber and the like. The outsole 114 can also include tread and other traction-enhancing features.

Moreover, the upper 120 can define a void 122 that receives a foot of the wearer. Stated differently, the upper 120 can define an interior surface 121 that defines the void 122, and the upper 120 can define an exterior surface 123 that faces in a direction opposite the interior surface 121. When the wearer's foot is received within the void 122, the upper 120 can at least partially enclose and encapsulate the wearer's foot.

Many conventional footwear uppers are formed from multiple material elements (e.g., textiles, polymer foam, polymer sheets, leather, synthetic leather) that are joined through stitching or bonding, for example. In contrast, at least a portion of upper 120 is formed from a knitted component 116 having a unitary knit construction. The outer boundaries of the knitted component 116 can be defined by a peripheral edge 199, which is shown in FIGS. 5 and 6. As will be discussed, knitted component 116 can define at least a portion of the void within upper 120. Also, the knitted component 116 can define at least a portion of the exterior surface 123 and/or the interior surface 121 of the upper 120.

In some embodiments, the knitted component 116 can define a majority of the upper 120. Decreasing the number of material elements used in forming the upper 120 may decrease waste, while also increasing the manufacturing efficiency and recyclability of the upper 120. As discussed in greater detail below, the knitted component 116 of the upper 120 of the present disclosure can decrease waste and increase manufacturing efficiency and recyclability. Additionally, the knitted component 116 of the upper 120 can incorporate smaller numbers of seams or other discontinuities, thereby enhancing the overall comfort of footwear 100.

The knitted component 116 may also have common properties when formed from the same strand, yarn (or type of yarn) or with similar knit structures. For example, using the same strand in various portions of the knitted component 116 can impart similar durability, strength, stretch, wear-resistance, biodegradability, thermal, and hydrophobic properties. In addition to physical properties, using the same strand in multiple portions of the knitted component 116 can impart common aesthetic or tactile properties, such as color, sheen, and texture. Using the same knit structures across different portions of the knitted component 116 may also impart common physical properties and aesthetic properties.

Knitted Component Configurations

Figure 4:
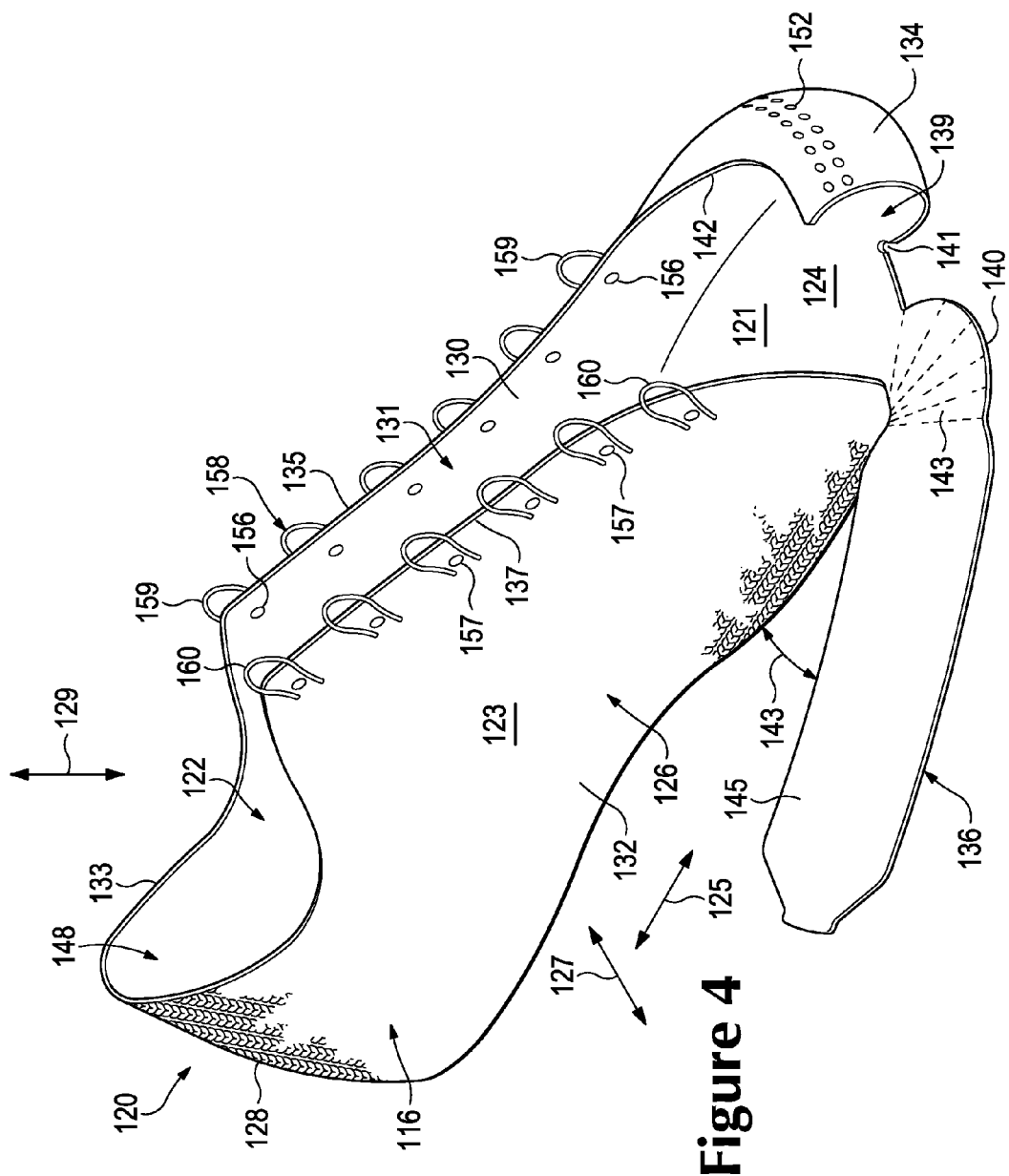
FIG. 4 is a perspective view of a knitted component with inlaid strands of the article of footwear of FIG. 1.

FIGS. 4-6 illustrate various embodiments of knitted components 116 that may be incorporated into articles of footwear in a similar manner as the exemplary embodiment of FIGS. 1 through 3. The knitted component 116 illustrated in FIGS. 4-6 are depicted separate from a remainder of footwear 100. However, it should be understood that each of the embodiments of knitted component 116 described herein may be combined with the elements of footwear 100, described above, to form an article of footwear 100 incorporating the knitted component 116.

The knitted component 116 can be of "unitary knit construction." As defined herein and as used in the claims, the term "unitary knit construction" means that the knitted component 116 is formed as a one-piece element through a knitting process. That is, the knitting process substantially forms the various features and structures of knitted component 116 without the need for significant additional manufacturing steps or processes. A unitary knit construction may be used to form a knitted component having structures or elements that include one or more courses of yarn or other knit material that are joined such that the structures or elements include at least one course in common (i.e., sharing a common strand or common yarn) and/or include courses that are substantially continuous between each portion of the knitted component 116. With this arrangement, a one-piece element of unitary knit construction is provided.

Although portions of knitted component 116 may be joined to each other following the knitting process, knitted component 116 remains formed of unitary knit construction because it is formed as a one-piece knit element. Moreover, knitted component 116 remains formed of unitary knit construction when other elements (e.g., an inlaid strand, a closure element, logos, trademarks, placards with care instructions and material information, and other structural elements) are added following the knitting process.

FIGS. 4-6 illustrate exemplary embodiments of the knitted component 116 as defining a majority of the upper 120 of the article of footwear 100. As shown, the knitted component 116 of the upper 120 can include a base portion 124 or strobel portion or underfoot portion. Also, the knitted component 116 can include one or more side portions 126 that extend from the base portion 124. The base portion 124 can be configured to be adjacent the sole structure 110. For instance, the base portion 124 can attach directly or indirectly to the sole structure 110 such that the base portion 124 lies over the sole structure 110. In additional embodiments, one or more parts of the base portion 124 (e.g., a periphery of the base portion 124) can attach to the sole structure 110 while other parts remain detached or decoupled. Also, the base portion 124 can be configured to extend underneath the wearer's foot. The side portion(s) 126 can extend from the base portion 1242 and can be configured to at least partially cover over the wearer's foot. Also, the base portion 124 and side portion(s) 126 can cooperate to define a void 122 that receives the wearer's foot. Again, the base portion 124 and the side portion(s) 126 can be formed of a unitary knit construction as discussed above.

As shown in the illustrated embodiments, the side portions 126 of the knitted component 116 can include a heel portion 128, a lateral portion 130, a medial portion 132, a forefoot portion 134, and a tongue portion 136, each of which are formed of the same unitary knit construction as the base portion 124. Thus, the knitted component 116 can fit and conform closely to the wearer's foot. Also, because of this construction, the knitted component 116 can be formed relatively quickly to increase manufacturing efficiency.

Also, as shown in FIG. 6 and as will be discussed in detail, the knitted component 116 can include one or more tensile strands 158 that are incorporated with the unitary knit construction of the knitted component 116. For instance, the strands 158 can be inlaid within the courses and/or wales of the knitted component 116 as will be discussed. Also, the strands 158 can be attached to the interior and/or exterior surface of the knitted component 116.

The strand(s) 158 can be disposed in the upper to extend across the sides and/or under the wearer's foot. Also, the strand(s) 158 can be operably coupled to a closure member 154, such as a shoelace 155. Thus, tensioning the shoelace 155 can, in turn, tension the strand(s) 158. As a result, the strand(s) 158 can provide support to the wearer's foot for increased comfort and better fit.

The illustrated embodiments of the upper 120 and the footwear 100 is configured to be worn on a left foot of the wearer. However, it will be appreciated that the footwear 100 can be configured to be worn on the right foot and can include similar features as the illustrated embodiments.

The footwear 100 can also be configured as a running shoe. However, the footwear 100 may also be applied to a variety of other athletic footwear types, including baseball shoes, basketball shoes, cycling shoes, football shoes, tennis shoes, soccer shoes, training shoes, walking shoes, and hiking boots, for example. The concepts may also be applied to footwear types that are generally considered to be non-athletic, including dress shoes, loafers, sandals, and work boots. Accordingly, the concepts disclosed with respect to footwear 100 apply to a wide variety of footwear types.

Exemplary Features of Knitted Component

In exemplary embodiments schematically illustrated in FIG. 13, the primary element of knitted component 116 may be formed from at least one yarn 1138 or other strand that is manipulated (e.g., with a knitting machine) to form a plurality of intermeshed loops that define a variety of courses and wales. Although yarn 1138 forms each of the courses and wales in this configuration, additional yarns may form one or more of the courses and/or wales.

The properties that a particular type of yarn will impart to an area of a knitted component partially depend upon the materials that form the various filaments and fibers within the yarn. Cotton, for example, provides a soft hand, natural aesthetics, and biodegradability. Elastane and stretch polyester each provide substantial stretch and recovery, with stretch polyester also providing recyclability. Rayon provides high luster and moisture absorption. Wool also provides high moisture absorption, in addition to insulating properties and biodegradability. Nylon is a durable and abrasion-resistant material with relatively high strength. Polyester is a hydrophobic material that also provides relatively high durability.

Additional examples of a suitable configuration for a portion of knitted component 116 is depicted in FIG. 14. In this configuration, knitted component 116 includes yarn 1138 and another yarn 1139 (i.e., plural strands). Yarns 1138 and 1139 are plated and cooperatively form a plurality of intermeshed loops defining multiple horizontal courses and vertical wales. That is, yarns 1138 and 1139 run parallel to each other. An advantage of this configuration is that the properties of each of yarns 1138 and 1139 may be present in this area of knitted component 1130. For example, yarns 1138 and 1139 may have different colors, with the color of yarn 1138 being primarily present on a face of the various stitches in knit element 1131 and the color of yarn 1139 being primarily present on a reverse of the various stitches in knit element 1131. As another example, yarn 1139 may be formed from a yarn that is softer and more comfortable against the foot than yarn 1138, with yarn 1138 being primarily present on first surface 1136 and yarn 1139 being primarily present on second surface 1137.

Moreover, as shown in FIGS. 13 and 14, a strand 1132 can be incorporated in the unitary knit construction of the knitted component 116. The strand 1132 can be a tensile strand element that provides support to the knitted component 116. Stated differently, tension within the strand 1132 can allow the knitted component 116 to resist deformation, stretching, or otherwise provide support for the wearer's foot during running, jumping, or other movements of the wearer's foot. Also, it will be appreciated that the strand 158 of FIG. 6 (mentioned above and described in detail below) can be incorporated in the knitted component 116 similar to the strand 1132 of FIGS. 13 and 14.

As will be discussed, the strand 1132 can be incorporated or inlaid into the unitary knit construction of the knitted component 116 such that the strand 1132 can be incorporated during the knitting processes on the knitting machine. For instance, the strand 1132 can be inlaid within the unitary knit construction such that the strand 1132 extends along one of the courses as shown in FIGS. 13 and 14 and/or the wales of the knitted component 116. As shown in FIGS. 13 and 14, the strand 1132 and can alternate between being located (a) behind loops formed from yarn 1138 and (b) in front of loops formed from yarn 1138. In effect, inlaid strand 1132 weaves through the unitary knit construction of knit element 1131.

The knitted component may also include one or more strands or yarns that are formed from at least one of a thermoset polymer material and natural fibers (e.g., cotton, wool, silk). Other yarns or strands may be formed from a thermoplastic polymer material. In general, a thermoplastic polymer material melts when heated and returns to a solid state when cooled. More particularly, the thermoplastic polymer material transitions from a solid state to a softened or liquid state when subjected to sufficient heat, and then the thermoplastic polymer material transitions from the softened or liquid state to the solid state when sufficiently cooled. As such, thermoplastic polymer materials are often used to join two objects or elements together. In this case, yarn may be utilized to join (a) one portion of yarn to another portion of yarn, (b) yarn and inlaid strand to each other, or (c) another element (e.g., logos, trademarks, and placards with care instructions and material information) to knitted component, for example. As such, yarn may be considered a fusible yarn given that it may be used to fuse or otherwise join portions of knitted component to each other. Moreover, yarn may be considered a non-fusible yarn given that it is not formed from materials that are generally capable of fusing or otherwise joining portions of knitted component to each other. That is, yarn may be a non-fusible yarn, whereas other yarn(s) may be a fusible yarn. In some configurations of knitted component, yarn (i.e., the non-fusible yarn) may be substantially formed from a thermoset polyester material and yarn (i.e., the fusible yarn) may be at least partially formed from a thermoplastic polyester material.

The use of plated yarns may impart advantages to knitted component. When yarn is heated and fused to yarn and inlaid strand, this process may have the effect of stiffening or rigidifying the structure of knitted component. Moreover, joining (a) one portion of yarn to another portion of yarn or (b) yarn and inlaid strand to each other has the effect of securing or locking the relative positions of yarn and inlaid strand, thereby imparting stretch-resistance and stiffness. That is, portions of yarn may not slide relative to each other when fused with yarn, thereby preventing warping or permanent stretching of knit element due to relative movement of the knit structure. Another benefit relates to limiting unraveling if a portion of knitted component becomes damaged or one of yarns is severed. Accordingly, areas of knitted component may benefit from the use of both fusible and non-fusible yarns within knit element.

Additionally, it will be appreciated that the knitted component can have varying zones that collectively form the unitary knit construction. For instance, the knitted component can include a combination at least two of the following: a flat knit zone, a tubular knit zone, a 1×1 mesh knit zone, a 2×2 mesh knit zone, a 3×2 mesh knit zone, a 1×1 mock mesh knit zone, a 2×2 mock mesh knit zone, a 2×2 hybrid knit zone, a full gauge knit zone, a ½ gauge knit zones, and the like. Accordingly, the knitted component 116 and upper 120 can be constructed according to the teachings of U.S. Patent Publication No. 2012/0233882, which published on Sep. 20, 2012, and which is hereby incorporated by reference in its entirety.

Embodiments of Upper and Knitted Component

Various embodiments of the upper 120 and knitted component 116 will now be discussed in greater detail. As shown, the upper 120 can define a longitudinal direction 125, a transverse direction 127, and a vertical direction 129, which will be used for referencing different features of the upper 120 in the below discussion.

As mentioned above, the knitted component 116 of the upper 120 can include a base portion 124, which is configured to be disposed underneath the wearer's foot. An outline of the wearer's foot is shown in FIG. 6, such that the base portion 124 is at least generally defined relative to the wearer's foot. Thus, the base portion 124 can extend continuously underneath one or more portions of the heel, the sole, the toes, the arch, and/or other inferior surfaces of the wearer's foot. In additional embodiments, the base portion 124 can include openings and so as to extend partially or discontinuously under the wearer's foot The knitted component 116 can also include various side portions 126 that extend peripherally from the base portion 124. The side portions 126 can be configured to cover over and lie against at least a portion of the wearer's foot. In the embodiments illustrated, the side portions 126 of the knitted component 116 can substantially encompass the base portion 124. Also, it will be appreciated that the base portion 124 and the side portions 126 can collectively define the interior surface 121 of the knitted component 116 as well as the exterior surface 123 of the knitted component 116.

For instance, the side portions 126 can include a heel portion 128, which is disposed on one end of the base portion 124. The heel portion 128 can also extend upwards from the base portion 124 in the vertical direction 129 as shown in FIG. 4. The heel portion 128 can be configured to cover over a heel and/or an ankle area of the wearer's foot.

The side portions 126 of the knitted component 116 can also include a lateral portion 130, which is disposed forward relative to the heel portion 128, and which can extend upwards from a lateral side of the base portion 124 as shown in FIG. 4. The lateral portion 130 can be configured to cover over and lie against a lateral area of the wearer's foot.

Furthermore, the side portions 126 of the knitted component 116 can include a medial portion 132, which is disposed on an opposite side of the base portion 124 relative to the lateral portion 130 and forward of the heel portion 128. The medial portion 132 can further extend upwards in the vertical direction 129 from the base portion 124 as shown in FIG. 4. The medial portion 132 can be disposed on an opposite side of the base portion 124 in the transverse direction 127. The medial portion 132 can be configured to cover over and lie against a medial area or instep of the wearer's foot.

The heel portion 128, lateral portion 130, and medial portion 132 can collectively define a horseshoe-shaped collar 133 of the upper 120. The collar 133 can provide access into and out of the void 122 of the upper 120. Moreover, a lateral edge 135 of the lateral portion 130 and a medial edge 137 of the medial portion 132 can collectively define a throat 131 of the upper 120. The throat 131 can extend substantially parallel to the longitudinal direction 125, or the throat 131 can be disposed at an angle relative to the longitudinal direction 125. Also, although the throat 131 is substantially centered over the base portion 124 in the embodiments of FIG. 4, the throat 131 can be disposed to one side relative to the base portion 124 in the transverse direction 127. As will be discussed, the width of the throat 131 can be selectively varied by the closure member 154 so as to move the lateral and medial edges 135, 137 toward and away from each other. As a result, the footwear 100 can be selectively tightened on the wearer's foot and loosened from the wearer's foot.

Additionally, the side portions 126 of the knitted component 116 can include a forefoot portion 134. The forefoot portion 134 can be disposed on an opposite end of the base portion 124 relative to the heel portion 128 and forward of the lateral and medial portions 130, 132 in the longitudinal direction 125 as shown in FIG. 1. Also, the forefoot portion 134 can be integrally connected to either the lateral portion 130 or the medial portion 132, and the forefoot portion 134 can be spaced from the other. In the embodiments shown, for instance, the forefoot portion 134 is integrally connected to the lateral portion 130 and is spaced from the medial portion 132. Accordingly, when the upper 120 is in a disassembled state as shown in FIG. 4, a gap 139 can be defined between the forefoot portion 134 and the medial portion 132.

Still further, the side portions 126 of the knitted component 116 can include a tongue portion 136. As shown in FIG. 4, the tongue portion 136 can include a curved region 143 and a longitudinal region 145. When the upper 120 is disassembled as shown in FIG. 4, the tongue portion 136 can extend generally forward from the base portion 124, and the curved region 143 can be disposed within the gap 139 between the medial and forefoot portions. The curved region 143 can also curve such that the longitudinal region 145 extends generally rearwardly and at an angle 143 relative to the medial portion 132 as shown in FIG. 4. The curvature of the curved region 143 can be achieved by having knit courses that substantially radiate from a common area 151 as shown in FIG. 5. The common area 151 can be an imaginary point that is spaced from the periphery of the curved region 143, between the tongue portion 136 and the medial portion 132 as shown, or the common area 151 can be disposed elsewhere. Also, when the upper 120 is assembled, the curved region 143 can wrap upwards to at least partially fill the gap 139, and the longitudinal region 145 of the tongue portion 136 can be disposed within the throat 131 of the upper to cover over the wearer's foot between the lateral portion 130 and the medial portion 132. Moreover, when the upper 120 is assembled, the longitudinal region 145 of the tongue portion 136 can be detached and decoupled from the lateral and/or medial portions 130, 132 as shown in FIG. 3.

As shown in FIGS. 4, 5, and 6, the base portion 124 and the heel portion 128 can define a heel cavity 148 that is configured to receive a heel of the wearer's foot (see FIG. 6). The heel cavity 148 can have interior and/or exterior surfaces with three dimensional curvature. Also, the heel cavity 148 can have a convex outer surface. Thus, as the heel portion 128 extends in the vertical direction 129 from the base portion 124, the heel portion 128 can curve forward slightly in the longitudinal direction 125. Also, as the heel portion 128 extends in the transverse direction 127, both sides of the heel portion 128 can curve forward in the longitudinal direction 125 to join to the lateral and medial portions 130, 132. Accordingly, the heel cavity 148 can conform and approximately correspond to the shape of the wearer's heel and ankle.

Furthermore, as shown in FIGS. 4, 5, and 6, the base portion 124 and the forefoot portion 134 can define a forefoot cavity 150 that is configured to receive the toes and other forefoot regions of the wearer's foot (see FIG. 6). The forefoot cavity 150 can have interior and/or exterior surfaces with three dimensional curvature. Also, the forefoot cavity 150 can have a convex outer surface. Thus, as the forefoot portion 134 extends in the vertical direction 129 from the base portion 124, the forefoot portion 134 can curve rearwardly in the longitudinal direction 125. Also, as the forefoot portion 134 extends in the transverse direction 127, the forefoot portion 134 can curve rearwardly in the longitudinal direction 125 to join to the lateral portion 130.

The three dimensional curvature of the heel cavity 148 and/or the forefoot cavity 150 can be formed due to the unitary knit construction of the knitted component 116. For instance, as shown in FIG. 8, the heel portion 128 can include at least two tapered areas 170, 171. The tapered areas 170, 171 can have boundaries 173 that taper generally in the transverse direction 127 as indicated by broken lines. The tapered areas 170, 171 each have a plurality of courses, or row of stitches; however, the successive courses can have different lengths to thereby provide the tapered shape of the boundaries 173. Thus, the tapered areas 170, 171 can have an eye shape, a double pointed oval shape, a biconvex shape, or a crescent shape.

Also, the boundary 173 of the tapered area 170 is joined to the boundary 173 of the tapered area 171 in the unitary knit construction to provide the knitted component 116 with three dimensional curvature. This can produce a visually evident distortion along the joined boundaries 173. The distortion can be a so-called fully fashioned mark extending along the joined boundaries 173 in the knitted component 116.

In the embodiments of FIG. 8, there are a plurality of tapered areas that are joined along respective boundaries such that the tapered areas extend from the collar 133 to the base portion 124 and a majority of the heel portion 128 includes these tapered areas. Accordingly, a majority of the heel portion 128 can have three-dimensional curvature. However, it will be appreciated that knitted component 116 can include any number of tapered areas 170, 171 on any portion of the knitted component 116 to provide three dimensional curvature to the knitted component 116. Also, the tapered areas 170, 171 can be oriented in any suitable direction on the knitted component 116. For instance, the forefoot portion 134 can similarly include tapered areas; however, such tapered areas can taper in the vertical direction 129 in exemplary embodiments.

The curved region 143 of the tongue portion 136 can also include a plurality of tapered areas that provide the curved region 143 with curvature. For instance, the curved region 143 can include tapered areas 193, 195 that are integrally knit together and joined along boundaries 197. This can produce a visually evident distortion along the joined boundaries 197. The distortion can be a so-called fully fashioned mark extending along the joined boundaries 197 in the knitted component 116. Additionally, as mentioned above, the courses within the curved region 143 can radiate from common area 151 to provide two-dimensional curvature.

Also, in some embodiments, the forefoot portion 134 can include a plurality of openings 152 that are arranged to assist with increasing curvature of the forefoot portion 134. In the embodiments illustrated, the plurality of openings 152 can include one or more rows of through-holes. Because the openings 152 reduce the amount of knitted material at those areas of the forefoot portion 134, the forefoot portion 134 can readily curve rearward toward the heel portion 128.

The knitted component 116 can additionally include at least two edge portions 140, 142 that are configured to be joined together when assembling the upper 120. It will be appreciated that the first edge portion 140 can be a first longitudinal section of larger peripheral edge 199 of the knitted component 116 shown in FIGS. 5 and 6. It will also be appreciated that the second edge portion 142 can be a second longitudinal section of the peripheral edge 199. The edge portions 140, 142 can be defined in any suitable location long the peripheral edge 199 and/or anywhere on the knitted component 116. As shown in FIGS. 5 and 6, the first edge portion 140 can extend along the curved region 143 of the tongue portion 136 and can also extend partially through the base portion 124 in the transverse direction 127, adjacent the forefoot portion 134. The second edge portion 142 can curve along the forefoot portion 134, generally in the transverse direction 127 and can extend downward in the vertical direction 129 along the forefoot portion 134 so as to partially define the gap 139. The first edge 140 and the second edge 142 can also meet at a notch 141 defined within the base portion 124 as shown in FIG. 4.

As mentioned above, the footwear 100 can further include a closure member 154, which is illustrated in FIG. 1. The closure member 154 can selectively secure the upper 120 to the wearer's foot and selectively release the upper 120 from the wearer's foot.

As shown in FIG. 1, the closure member 154 can be a shoelace 155. As such, the lateral portion 130 can include one or more lateral closure openings 156, such as through-holes that are disposed in a row extending along the lateral edge 135. The medial portion 132 can include similar medial closure openings 157 that are disposed in a row extending along the medial edge 137. The openings 156, 157 can receive the shoelace 155 such that the shoelace 155 can criss-cross, zigzag, and alternate between the lateral and medial portions 130, 132.

It will be appreciated that the openings 156, 157 could be configured differently from the through-holes shown in FIG. 1. For instance, the openings 156, 157 could be defined by hoops, grommets, hooks, and other suitable features that are configured to receive a closure member and that are either integrated into the knitted component 116 or are removably attached to the knitted component 116.

Also, it will be appreciated that the closure member 154 could include structure other than the shoelace 155 without departing from the scope of the present disclosure. For instance, the closure member 154 could be a strap, a buckle, pile tape, or other suitable closure member.

Still further, as shown in FIG. 6, the upper 120 can include at least one tensile strand 158 that is coupled to the base portion 124 and/or the side portions 126. The strand 158 can be coupled to any portion of the base portion 124 and/or the side portion 126. Additionally, the strand 158 can be coupled to the base portion 124 and/or the side portion 126 in any suitable fashion. For instance, the strand 158 can be inlaid within courses and/or wales of the unitary knit construction of the base portion 124 and side portions 126 as will be discussed. Thus, the strand 153 can correspond to the strand 1132 described above and shown in FIGS. 13 and 14. The strand 158 can also be adhered, fastened, pierced through, or otherwise coupled to the interior or exterior surfaces 121, 123 of the base portion 124 and/or the side portion 126.

The strand 158, knitted component 116, and upper 120 can incorporate the teachings of one or more of commonly-owned U.S. patent application Ser. No. 12/338,726 to Dua et al., entitled "Article of Footwear Having An Upper Incorporating A Knitted Component", filed on Dec. 18, 2008 and published as U.S. Patent Application Publication Number 2010/0154256 on Jun. 24, 2010, and U.S. patent application Ser. No. 13/048,514 to Huffa et al., entitled "Article Of Footwear Incorporating A Knitted Component", filed on Mar. 15, 2011 and published as U.S. Patent Application Publication Number 2012/0233882 on Sep. 20, 2012, both of which applications are hereby incorporated by reference in their entirety (collectively referred to herein as the "Inlaid Strand cases").

The strand 158 can be an elongate and flexible. Also, the strand 158 can include at least one yarn, cable, wire, string, cord, filament, fiber, thread, rope, and the like. Also, the strand 158 can be formed from rayon, nylon, polyester, polyacrylic, silk, cotton, carbon, glass, aramids (e.g., para-aramid fibers and meta-aramid fibers), ultra high molecular weight polyethylene, liquid crystal polymer, copper, aluminum, steel, or other suitable material. An individual filament utilized in the strand 158 may be formed form a single material (i.e., a monocomponent filament) or from multiple materials (i.e., a bicomponent filament). Similarly, different filaments may be formed from different materials. As an example, yarns utilized as strand 158 may include filaments that are each formed from a common material, may include filaments that are each formed from two or more different materials, or may include filaments that are each formed from two or more different materials. Similar concepts also apply to threads, cables, ropes, etc. The thickness (diameter) of strand 158 can be within a range from approximately 0.03 millimeters to 5 millimeters, for example. Also, the strand 158 can have a substantially circular cross section, an ovate cross section, or a cross section of any other suitable shape.

As an example, the strand 158 may be formed from a bonded nylon 6.6 with a breaking or tensile strength of 3.1 kilograms and a weight of 45 tex. The strand 158 can also be formed from a bonded nylon 6.6 with a breaking or tensile strength of 6.2 kilograms and a tex of 45. As a further example, the strand 158 may have an outer sheath that sheathes and protects an inner core.

In some embodiments, the strand 158 can have a fixed length (e.g., can be nonextendible). Also in some embodiments, the strand 158 can be resiliently extendible.

Additionally, in some embodiments, the strand 158 can include a thermoplastic material that is configured to adhere, bond, or fuse to the base portion 124 and/or the side portions 126 of the upper 120. For instance, selective application of heat can cause materials in the strand 158 to fuse to the materials of the base portion 124 and/or the side portions 126. The strand 158 can, thus, be included according to the teachings of U.S. Patent Publication No. 2012/0233882, which published on Sep. 20, 2012, and which is incorporated herein by reference in its entirety.

As shown in the embodiments of FIG. 6, the upper 120 can include a single strand 158 that extends continuously between the medial portion 132, the base portion 124, and the lateral portion 130. Also, the strand 158 can include one or more turns 159, 160. The turns 159, 160 can be one hundred eighty degree turns or greater. Specifically, the strand 158 can include a plurality of lateral turns 159 that are arranged in a row along the lateral edge 135, and the strand 158 can include a plurality of medial turns that are arranged in a row along the medial edge 137. The strand 158 can also extend linearly between pairs of the turns 159, 160. Additionally, the strand 158 can include a first terminal end 164 that is disposed adjacent the heel portion 128, and the strand 158 can include a second terminal end 166 that is disposed adjacent the forefoot portion 134. The strand 158 can also alternatingly extend and zigzag between the lateral and medial portions 130, 132.

Figure 7:
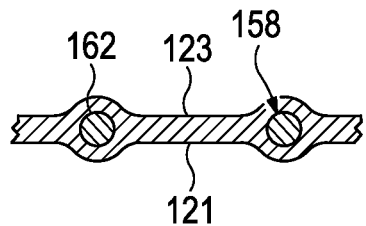
FIG. 7 is a section view of the knitted component taken along the line 7-7 of FIG. 6.

Furthermore, as shown in FIGS. 6 and 7, the knitted component 116 can define a passage 162 between the interior surface 121 and the exterior surface 123. The passage 162 can be defined in any suitable fashion. For instance, in embodiments in which the strand 158 is inlaid within the knitted component 116, the passage 162 can be defined through one or more courses or wales of the knitted component 116. Also, in some embodiments, the interior surface 121 can be defined by a layer of knitted material and the exterior surface 123 can be defined by a separate layer of knitted material, and a plurality of strands, filaments, or monofilaments can extend and provide spacing between these layers (e.g., a so-called "spacer knit material"). In these embodiments, the passage 162 can be defined between the layers of knitted material and among the plurality of spacer strands. In additional embodiments, the interior surface 121 and the exterior surface 123 can be interconnected stitched surfaces, and the passage 162 can be defined between these surfaces.

The passage 162 can extend across any portion of the upper 120. For instance, as indicated by broken lines in FIG. 6, the upper 120 can define a plurality of passages 162, and each passage 162 can extend continuously between the lateral portion 130, the base portion 124, and the medial portion 132. In the embodiments shown, each passage 162 extends partially across the lateral portion 130 (lateral passage), partially across the base portion 124 (base portion passage), and partially across the medial portion 132 (medial passage) such that the passage 162 is continuous between the lateral portion 130, the base portion 124, and the medial portion 132. However, it will be appreciated that one or more passage 162 can be localized and isolated on any portion of the upper 120.

As shown in FIG. 7, the strand 158 can be received and can extend longitudinally within one or more of the passages 162 so as to extend between the lateral portion 130, the base portion 124, and the medial portion 132. Also, the turns 159, 160 of the strand 158 can be exposed from the passages 162.

The lateral turns 159 can extend at least partially around respective ones of the lateral closure openings 156, and the medial turns 160 can extend at least partially around respective ones of the medial closure openings 157. Furthermore, as shown in FIG. 1, the shoelace 155 can be received within respective pairs of the lateral closure openings 156 and the lateral turns 159, and the shoelace 155 can also be received within respective pairs of the medial closure openings 157 and the medial turns 160. Stated differently, each pairing of lateral turn 159 and lateral closure opening 156 can cooperatively receive and support the shoelace 155, and each pairing of medial turn 160 and medial closure opening 157 can also receive and support the shoelace 155.

In some embodiments, the strand 158 can be loosely and moveably received within the respective passages 162. For instance, the strand 158 can slide longitudinally through the passages 162. Thus, as shown in FIG. 9, the turns 159, 160 can be pulled closer to the respective closure opening 156, 157. In additional embodiments, the first and/or the second terminal end 164, 166 of the strand 158 can be fixed (e.g., fused) to the base portion 124 while remaining portions of the strand 158 can remain moveable relative to the base, lateral, and medial portions 124, 130, 132. In still additional embodiments, portions of the strand 158 between the terminal ends 164, 166 can be fused or otherwise fixed to the base, lateral, and medial portions 124, 130, 132.

Accordingly, tensioning the shoelace 155 can, in turn, increase tension in the strand 158. For instance, as shown in FIG. 10, when the shoelace 155 is loose and in the unsecured position, tension in the strand 158 can be relatively low, thereby allowing the upper 120 to fit loosely about the wearer's foot. However, when the shoelace 155 is pulled and tensioned as indicated by arrows 174, 175, the shoelace 155 can pull on the turns 159, 160 to increase tension in the strand 158. As a result, the strand 158 can pull and conform the upper 120 closely to the wearer's foot as indicated by arrows 176, 177, 178, 179 in FIG. 11.

It will be appreciated that in the embodiments shown in FIGS. 10 and 11, the strand 158 can provide support for various areas on the bottom of the wearer's foot. For instance, the strand 158 can be disposed on an arch region 164 that is configured to be disposed underneath the arch of the wearer's foot. Thus, the strand 158 within the arch region 164 can support the wearer's arch, especially when the strand 158 is tensioned by the shoelace 155.

It will also be appreciated that, in the embodiments illustrated, the upper 120 can include only one continuous strand 158 for providing such support to the foot. Accordingly, the part count of the upper 120 can be relatively low, and the upper 120 can be constructed in an efficient manner.

Assembly of the Footwear

Assembly of the footwear 100, the knitted component 116 and upper 120 will now be discussed according to exemplary embodiments. For purposes of clarity, it will be assumed that the knitted component 116 and the strand 158 have been formed to the disassembled state shown in FIGS. 5 and 6.

To begin exemplary embodiments of the assembly of the upper 120, the lateral and medial portions 130, 132 can be moved (folded) superiorly to the position shown in FIG. 4. Then, the tongue portion 136 can be wrapped superiorly such that the curved region 143 substantially fills the gap 139 and the longitudinal region 145 substantially fills the throat 131. As such, the first and second edge portions 140, 142 can be disposed directly adjacent each other. Then, the first and second edge portions 140, 142 can be joined at a seam 144.

The first and second edge portions 140, 142 can be joined at the seam 144 in any suitable fashion. For instance, the first and second edge portions 140, 142 can be joined using stitching, adhesives, tape, bonding, welding, fasteners, or other suitable attachment devices.

In some embodiments, the seam 144 can be formed by stitching the edge portions 140, 142 together with stitching 146 as shown in FIGS. 1-3. As mentioned above, the upper 120 can be a knitted element with a plurality of stitches; however, it will be appreciated that the stitching 146 can be independent of the stitches of the knitted component 116. Stated differently, the stitching 146 can be formed using one or more threads, yarns, cables, or other strands that are attached after the knitted component 116 has been knitted. The stitching 146 can also be a zigzag stitch or other suitable stitch. Additionally, the edge portions 140, 142 can abut at the seam 144. For instance, the edge portions 140, 142 can form a butt joint, or the edge portions 140, 142 can be partially overlapped to form the seam 144. Additionally, the edge portions 140, 142 can be slightly spaced apart at the seam 144 with a bead of adhesive or other material between the edge portions 140, 142 at the seam 144.

Moreover, the seam 144 can extend across any suitable portion of the knitted component 116. For instance, in the embodiments of FIG. 3, the seam 144 can include a first terminal end 147 disposed in the base portion 124, adjacent the forefoot portion 134. The seam 144 can also include a second terminal end 149 at the junction of the lateral edge 135, the forefoot portion 134, and the tongue portion 136. Also, the seam 144 can extend continuously between the first and second terminal ends 147, 149 in some embodiments. For instance, the seam 144 can include a first portion 181 that extends across the base portion 124 generally in the transverse direction 127 toward the medial portion 132 from the first terminal end 147. The seam 144 can also include a second portion 183 that extends generally in the vertical direction 129 across the medial portion 132 and adjacent the forefoot portion 134. The seam 144 can further include a third portion 185 that extends generally in the transverse direction toward the lateral side 130 and that curves rearwardly toward the second terminal end 149. Thus, the seam 144 can extend continuously between the ends 147, 149 so as to extend from under the wearer's foot, around a medial area of the wearer's forefoot, to an area above the wearer's forefoot.

Also, there can be any number of seams 144 of the knitted component 116. As shown in the embodiments of FIG. 3, for instance, there can be only one, solitary seam 144 necessary for giving the knitted component 116 of the upper 120 the three dimensional shape shown in FIGS. 1-3. This can facilitate manufacturing and reduce time for assembly of the upper 120.

Also, the seam 144 can be spaced from the heel portion 128 such that the heel portion 128 is seamless. Thus, even if the heel portion 128 shifts on the wearer's heel, the relatively smooth and seamless heel portion 128 is unlikely to rub on the wearer's heel and provide discomfort to the wearer.

Subsequently, the shoelace 155 can be threaded through the lateral and medial openings 156, 157 and the lateral and medial turns 159, 160 as discussed above. Next, the sole structure 110 can be attached to the upper 120. Specifically, the midsole 112 can be attached to the exterior surface 123 of the base portion 124, and the outsole 114 can be attached to the midsole 112. In additional embodiments, an additional sockliner can be inserted over and/or attached to the interior surface 121 of the base portion 124.

Additional Embodiments of Knitted Component and Upper

Additional embodiments of the knitted component 116 of the upper 220 are illustrated in FIG. 12. The knitted component 116 and upper 220 can be substantially similar to the knitted component 116 and upper 120 described above, except as discussed.

The upper 220 can include a strand 258 that alternatingly extends across the medial portion 232, the base portion 224, and the lateral portion 230, similar to the embodiments discussed above. The strand 258 can also extend through one or more passages 262. However, the passages 262 can be defined on the medial portion 132 and the lateral portion 130, and the passages 262 can be spaced away from the base portion 224.

Accordingly, longitudinal portions of the strand 258 extending across the base portion 224 can be exposed from the passages 262. Also, these portions of the strand 258 can be detached and decoupled from the base portion 224. Thus, in some embodiments, these portions of the strand 258 can be free to be attached directly to the sole structure 110.

Furthermore, as shown in FIG. 12, in some embodiments, the passages 262 can be V-shaped such that the turns of the strand 258 are embedded and enclosed within the passages 262 unlike the exposed turns 159, 160 shown above in FIGS. 1-6.

Still further embodiments of the knitted component 316 and upper 320 are shown in FIGS. 24 and 25. The knitted component 316 and upper 320 can be substantially similar to the knitted component 116 and upper 120 described above, except as discussed.

As shown in FIG. 24, the knitted component 316 can include a base portion 324 and a side portion 326 that extends from the base portion 324. In some embodiments, the side portion 326 can substantially encompass the base portion 324. For instance, the side portion 326 can define the heel portion 328, the lateral portion 330, the medial portion 332, and the forefoot portion 334.

In addition, the upper 320 can include a plurality of parts 329, 331, which each individually have unitary knit construction, and the parts 329, 331 can be joined at one or more seams 333, 335, 337 as shown in FIG. 24. Thus, the parts 329, 331 can cooperate to define a void for receiving a foot. It will be appreciated that the upper 320 can include any suitable number of parts 329, 331 and any number of seams 333, 335, 337.

Each part 329, 331 can be formed from materials having unitary knit construction. For instance, as shown in FIG. 25, the parts 329, 331 can be formed from a first layer 381 and a second layer 383 of knit sheet material, and a plurality of spacer strands 385 can extend transversely between the layers 381, 383. The spacer strands 385 can be made from monofilaments or other suitable materials and can extend substantially perpendicularly between the layers 381, 383. The spacer strands 385 can also extend at an angle other than ninety degrees between the layers 381, 383, and the strands 385 can zig-zag between the layers 381, 383 in some embodiments. The spacer strands 385 can couple and provide spacing between the layers 381, 383. Thus, the parts 329, 331 can be made from so-called "spacer-knit materials", and can include materials disclosed in U.S. patent application Ser. No. 12/388,726, filed Dec. 18, 2008, published Jun. 24, 2012 as Publication No. 2010-0154256, and which is incorporated by reference in its entirety.

Also, as shown in FIG. 25, the first layer 381 can define the exterior surface 323 of the upper 320. Also, the second layer 383 can define the interior surface 321 of the upper 320.

Additionally, one or both of the layers 381, 383 can include one or more openings 397. There can be any number of openings 397, the openings 397 can have any shape, and the openings 397 can be arranged in any suitable fashion. For instance, as shown in the illustrated embodiments, the first layer 381 can include a plurality of rounded openings 397 that are arranged in rows extending between the medial portion 332 and the lateral portion 330 and across the base portion 324 in the transverse direction 327. In contrast, the second layer 383 can be substantially continuous and without openings 397.

The first part 329 can define the lateral portion 330 and lateral areas of the heel portion 328 and forefoot portion 334 of the upper 320. In contrast, the second part 331 can define the medial portion 332 and medial areas of the heel portion 328 and forefoot portion 334.

The parts 329, 331 can be joined at seams 333, 335, 337 such that the parts 329, 331 cooperate to define the foot-receiving void of the upper 320. The seams 333, 335, 337 can be defined in any suitable location on the upper 320.

Specifically, in the embodiments shown in FIG. 24, a seam 333 is substantially centered on the base portion 324 and extends in the longitudinal direction 325. Also, a forefoot seam 335 extends under the forefoot portion 334 and extends generally in the transverse direction 327. Furthermore, a heel seem 337 extends under the heel portion 328 and extends generally in the transverse direction 327.

The seams 333, 335, 337 can be secured in any suitable fashion, such as thread, yarn, or other strands, or adhesives, fasteners, tapes, or other suitable attachment implements. For instance, a thread, yarns, cables, or other types of strands can be used to secure the seams 333, 335, 337. It will be appreciated that these strands securing the seams 333, 335, 337 can be independent of the unitary knit construction of the parts 329, 331.

Also, one or more passages 362 can be defined longitudinally through the upper 320 as shown in FIG. 24 and radially between the interior and exterior surfaces 321, 323 as shown in FIG. 25. Thus, the passages 362 can be defined between the plurality of spacer strands 385 as shown in FIG. 25.

The passages 362 can extend across any portion of the upper 320. For instance, the passages 362 can extend at least partially across the base portion 324. In the exemplary embodiments illustrated, the passages 362 extend continuously between the medial portion 332 and the base portion 324 and/or the passages 362 extend continuously between the lateral portion 330 and the base portion 324. Also, in some embodiments, the passages 362 in the first part 329 can be substantially aligned longitudinally with the passages 362 in the second part 331.

As shown in FIGS. 24 and 25, tensile strands 358 can extend through respective ones of the passages 362. The tensile strands 358 can extend across any suitable location on the upper 320. For instance, the strands 358 can extend continuously between the lateral portion 330, the base portion 324, and the medial portion 322. In additional embodiments, the strands 358 can be localized on the base portion 324. The strands 358 can also be routed through the knitted component 316 in other ways as well.

As shown in FIGS. 24 and 25, the longitudinal portions of the strands 358 can be exposed exteriorly due to the openings 397. This can provide access to the strands 358 if the strands need to be manipulated. Also, the strands 358 can be a contrasting color from the layer 381 to increase the aesthetic appeal. Moreover, different strands 358 can have different colors from each other to increase aesthetic appeal.

Accordingly, like the embodiments discussed above and shown in FIGS. 1-6, the tensile strands 358 can increase in tension when the shoelace or other closure element is tightened. This can, in turn, draw the upper 320 against the foot and conform the upper 320 to the shape of the foot for added comfort. Also, the tension in the strands 358 can provide additional support to the foot.

Exemplary Knitting Processes for Forming Knitted Component and Upper

The knitted component 116 can be knitted in any suitable direction. For instance, the knitted component 116 can be formed from the heel portion 128, at the collar 133, and the knitted component 116 can be formed so as to grow generally in the longitudinal direction 125 toward the forefoot portion 134. The forefoot cavity 150 can be formed before the tongue portion 136. Then, the tongue portion 136 can be subsequently formed. Also, the strand 158 can be inlaid during this knitting process. It will also be appreciated that the three dimensionally curved cavities and the two dimensionally curved portions of the knitted component 116 (such as the heel cavity 148, the forefoot cavity 150, the curved region 143 and/or other areas) can be formed unitarily during the knitting process. Specifically, the stitches at the boundaries 173, 197 can be held by respective needles as subsequent courses of stitches are added, and the held stitches at the boundaries 173, 197 can be knitted to respective stitches across the boundaries 173, 197. Also, this process can be completed on any suitable machine, such as a flat knitting machine.

Referring now to FIGS. 15-23, exemplary automated knitting processes for forming the knitted component 116 with the strand 158 will be discussed. For purposes of discussion, flat knitting processes and flat knitting machines will be discussed, however, the knitted component 116 and strand 158 can be otherwise formed without departing from the scope of the present disclosure. Thus, the knitted component 116 and strand 158 can be formed according to the teachings of U.S. Patent Publication No. 2012/0233882, which published Sep. 20, 2012, and which is hereby incorporated by reference in its entirety.

Figure 15:
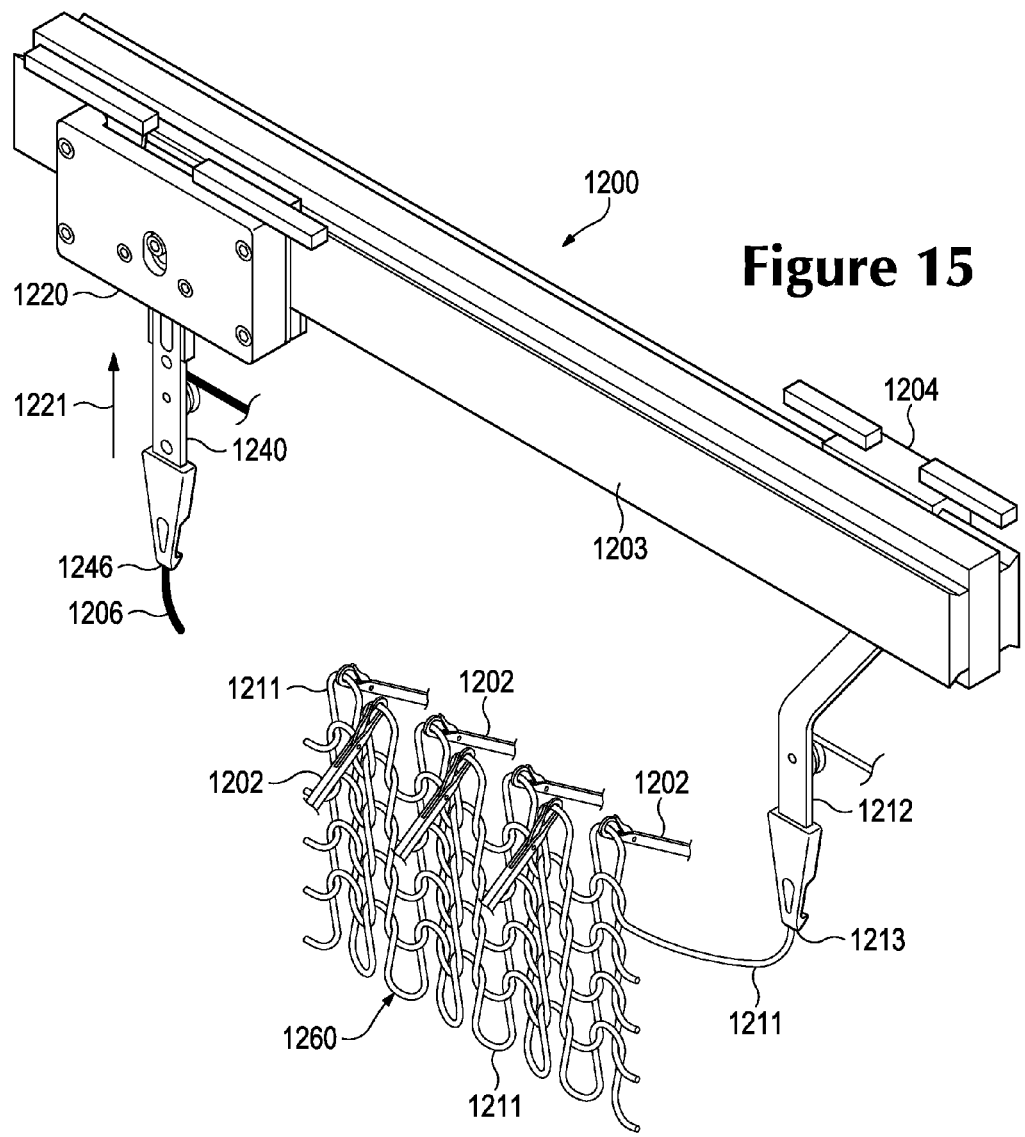

Referring to FIG. 15, a portion of knitting machine 1200 that includes various needles 1202, rail 1203, standard feeder 1204, and combination feeder 1220 is depicted. Whereas combination feeder 1220 is secured to a front side of rail 1203, standard feeder 1204 is secured to a rear side of rail 1203. Yarn 1206 passes through combination feeder 1220, and an end of yarn 1206 extends outward from dispensing tip 1246. Although yarn 1206 is depicted, any other strand (e.g., filament, thread, rope, webbing, cable, chain, or yarn) may pass through combination feeder 1220. Another yarn 1211 passes through standard feeder 1204 and forms a portion of a knitted component 1260, and loops of yarn 1211 forming an uppermost course in knitted component 1260 are held by hooks located on ends of needles 1202.

The knitting process discussed herein relates to the formation of knitted component 1260 or portion of knitted component 1260. Thus, the portion of the knitted component 1260 can correspond to the base portion 124, the heel portion 128, the lateral portion 130, the medial portion 132, the forefoot portion 134, and/or the tongue portion 136 discussed above in relation to FIGS. 1-6. For purposes of the discussion, only a relatively small section of knitted component 1260 is shown in the figures in order to permit the knit structure to be illustrated. Moreover, the scale or proportions of the various elements of knitting machine 1200 and knitted component 1260 may be enhanced to better illustrate the knitting process.

Figure 16:
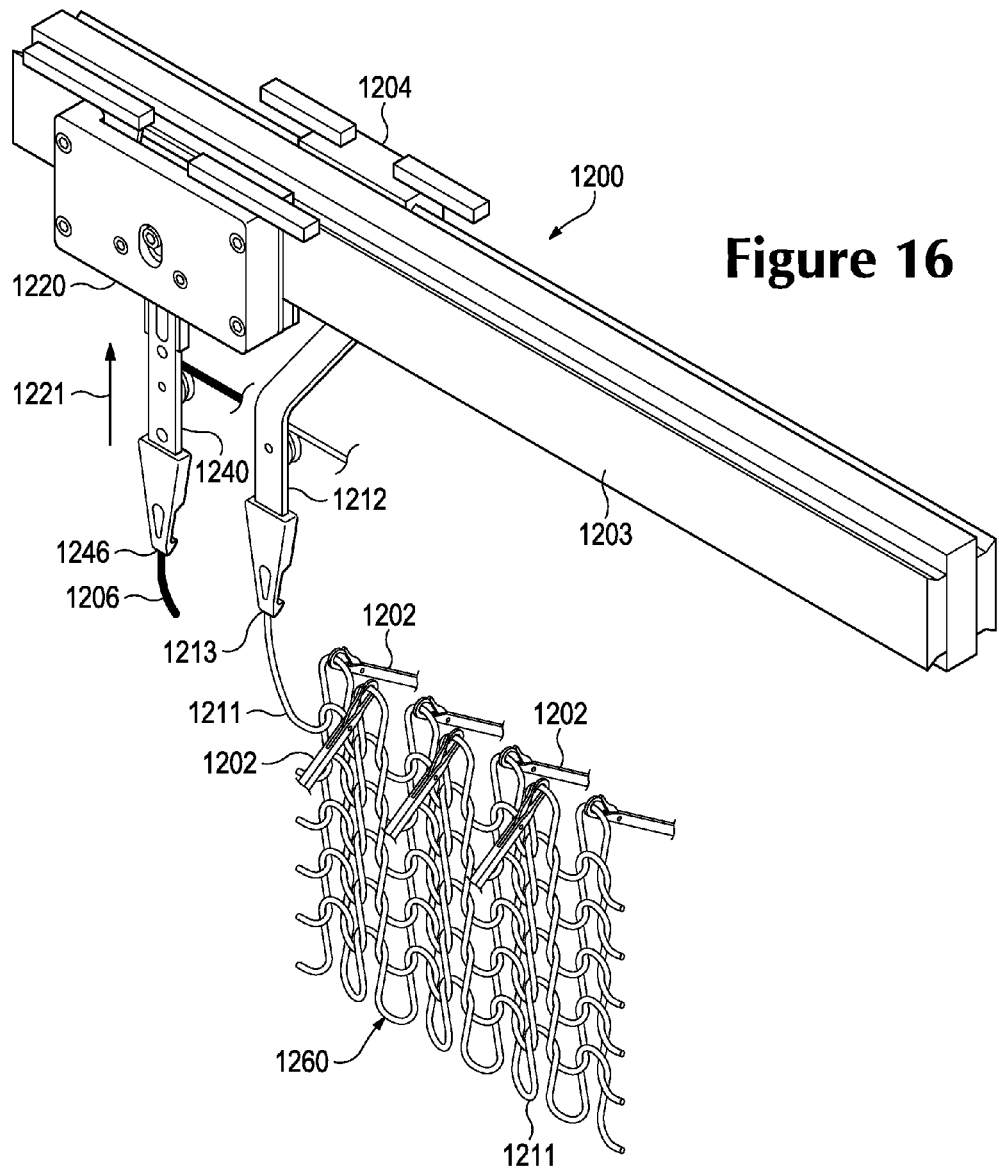

Referring now to FIG. 16, standard feeder 1204 moves along rail 1203 and a new course is formed in knitted component 1260 from yarn 1211. More particularly, needles 1202 pulled sections of yarn 1211 through the loops of the prior course, thereby forming the new course. Accordingly, courses may be added to knitted component 1260 by moving standard feeder 1204 along needles 1202, thereby permitting needles 1202 to manipulate yarn 1211 and form additional loops from yarn 1211.

Figure 17:
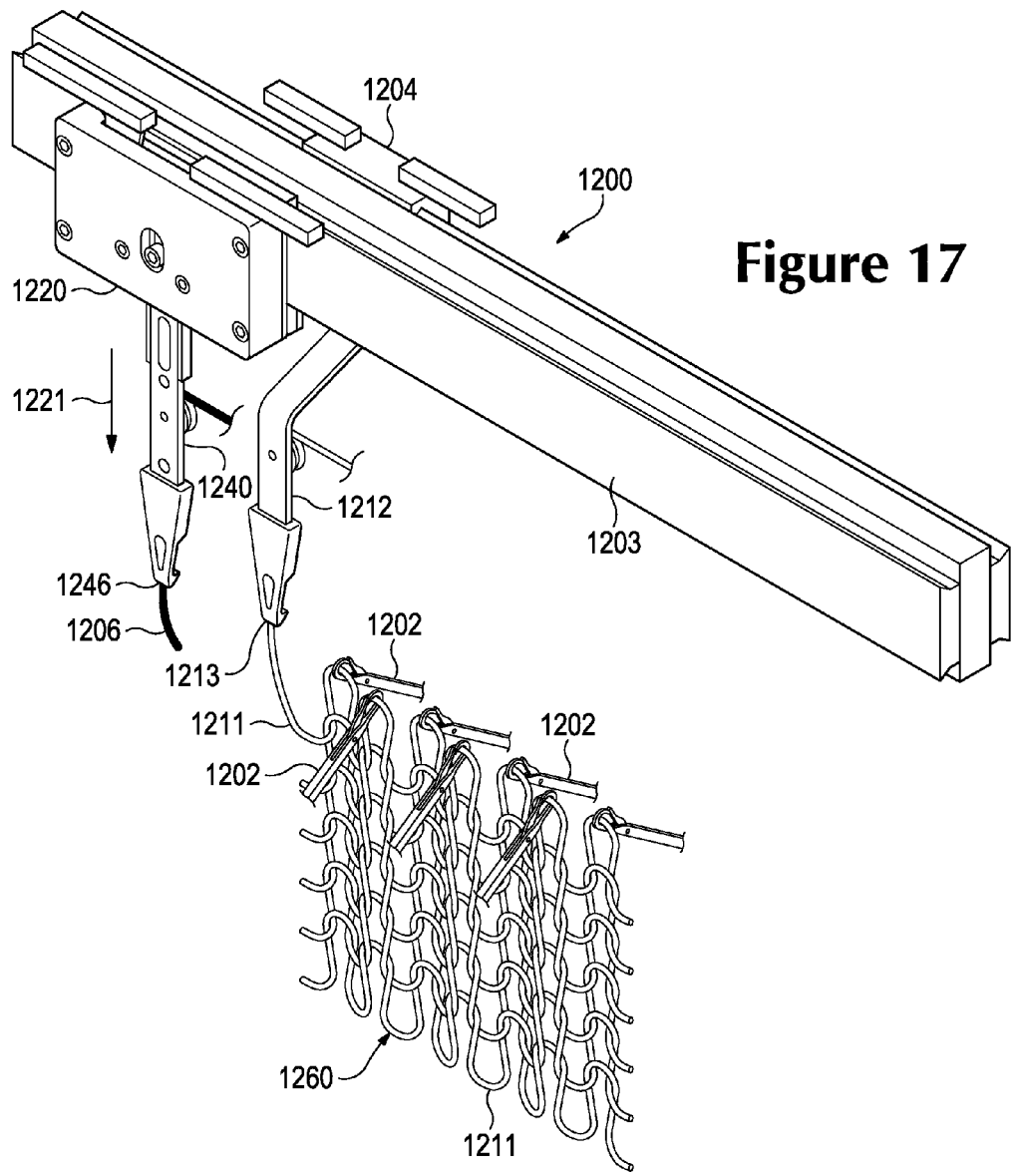

Continuing with the knitting process, feeder arm 1240 now translates from the retracted position to the extended position, as depicted in FIG. 17. In the extended position, feeder arm 1240 extends downward from carrier 1230 to position dispensing tip 1246 in a location that is (a) centered between needles 1202 and (b) below the intersection of needle beds.

Figure 18:
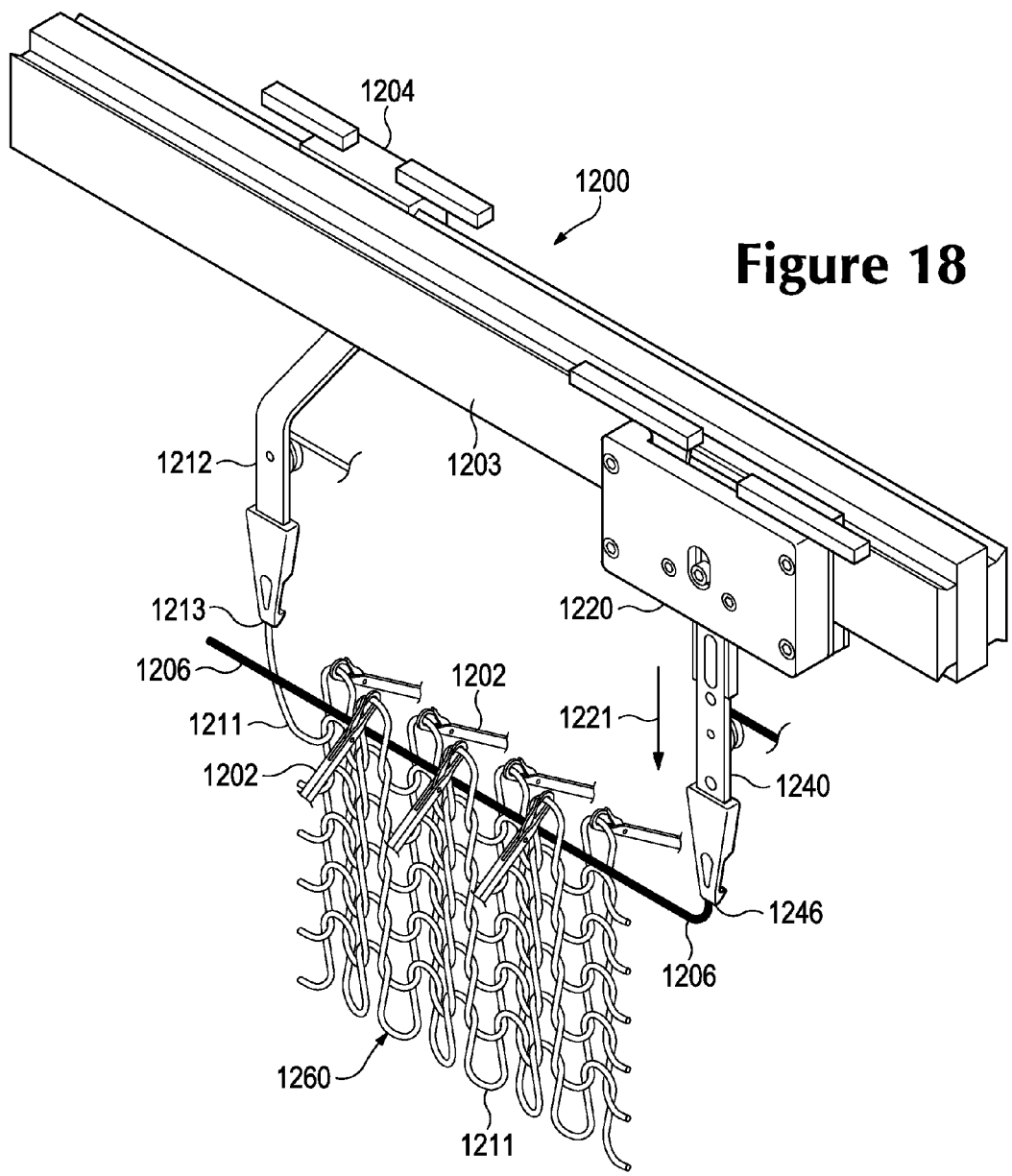

Referring now to FIG. 18, combination feeder 1220 moves along rail 1203 and yarn 1206 is placed between loops of knitted component 1260. That is, yarn 1206 is located in front of some loops and behind other loops in an alternating pattern. Moreover, yarn 1206 is placed in front of loops being held by needles 1202 from one needle bed 1201, and yarn 1206 is placed behind loops being held by needles 1202 from the other needle bed. Note that feeder arm 1240 remains in the extended position in order to inlay yarn 1206 in the area below the intersection of needle beds. This effectively places yarn 1206 within the course recently formed by standard feeder 1204 in FIG. 16.

Figure 19:
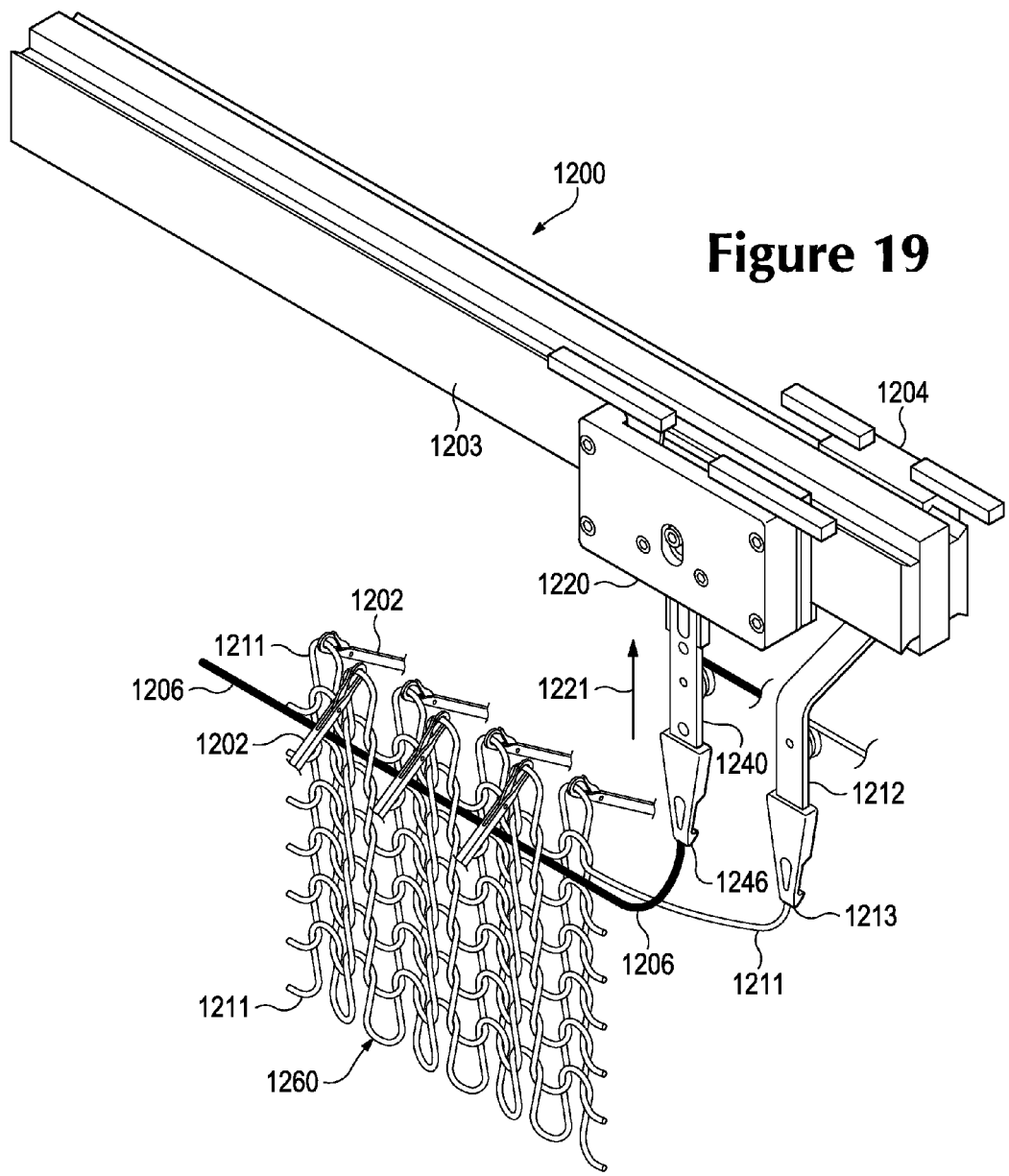

In order to complete inlaying yarn 1206 into knitted component 1260, standard feeder 1204 moves along rail 1203 to form a new course from yarn 1211, as depicted in FIG. 19. By forming the new course, yarn 1206 is effectively knit within or otherwise integrated into the structure of knitted component 1260. At this stage, feeder arm 1240 may also translate from the extended position to the retracted position.

FIGS. 18 and 19 show separate movements of feeders 1204 and 1220 along rail 1203. That is, FIG. 18 shows a first movement of combination feeder 1220 along rail 1203, and FIG. 19 shows a second and subsequent movement of standard feeder 1204 along rail 1203. In many knitting processes, feeders 1204 and 1220 may effectively move simultaneously to inlay yarn 1206 and form a new course from yarn 1211. Combination feeder 1220, however, moves ahead or in front of standard feeder 1204 in order to position yarn 1206 prior to the formation of the new course from yarn 1211.

The general knitting process outlined in the above discussion provides an example of the manner in which strand 158 of FIGS. 1-6 may be located in the base portion 124, the lateral portion 130, and/or the medial portion 132 of the upper 120. More particularly, because of the reciprocating action of feeder arm 1240, the strand 158 may be located within a previously formed course prior to the formation of a new course.

Figure 20:
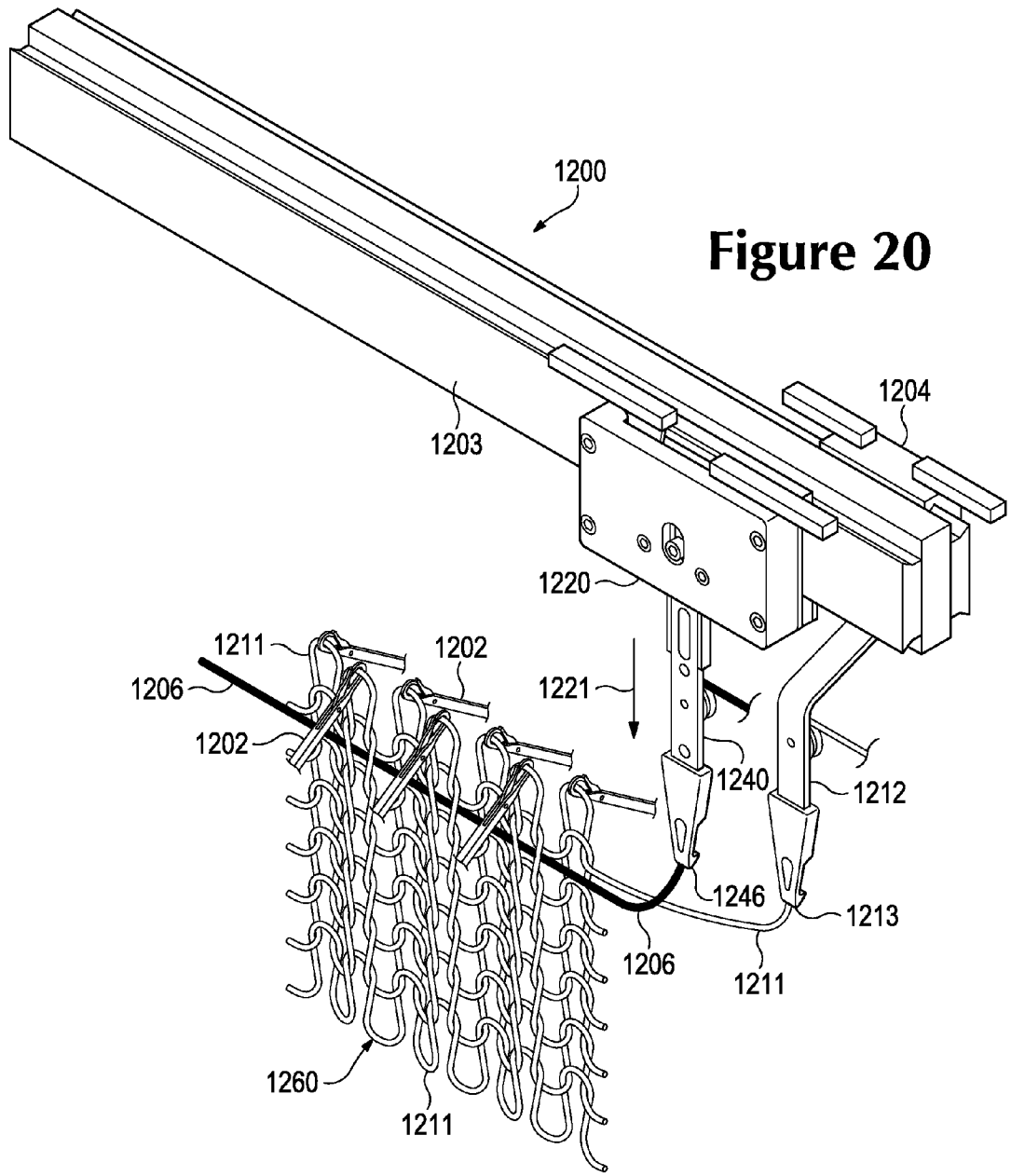
Figure 21:
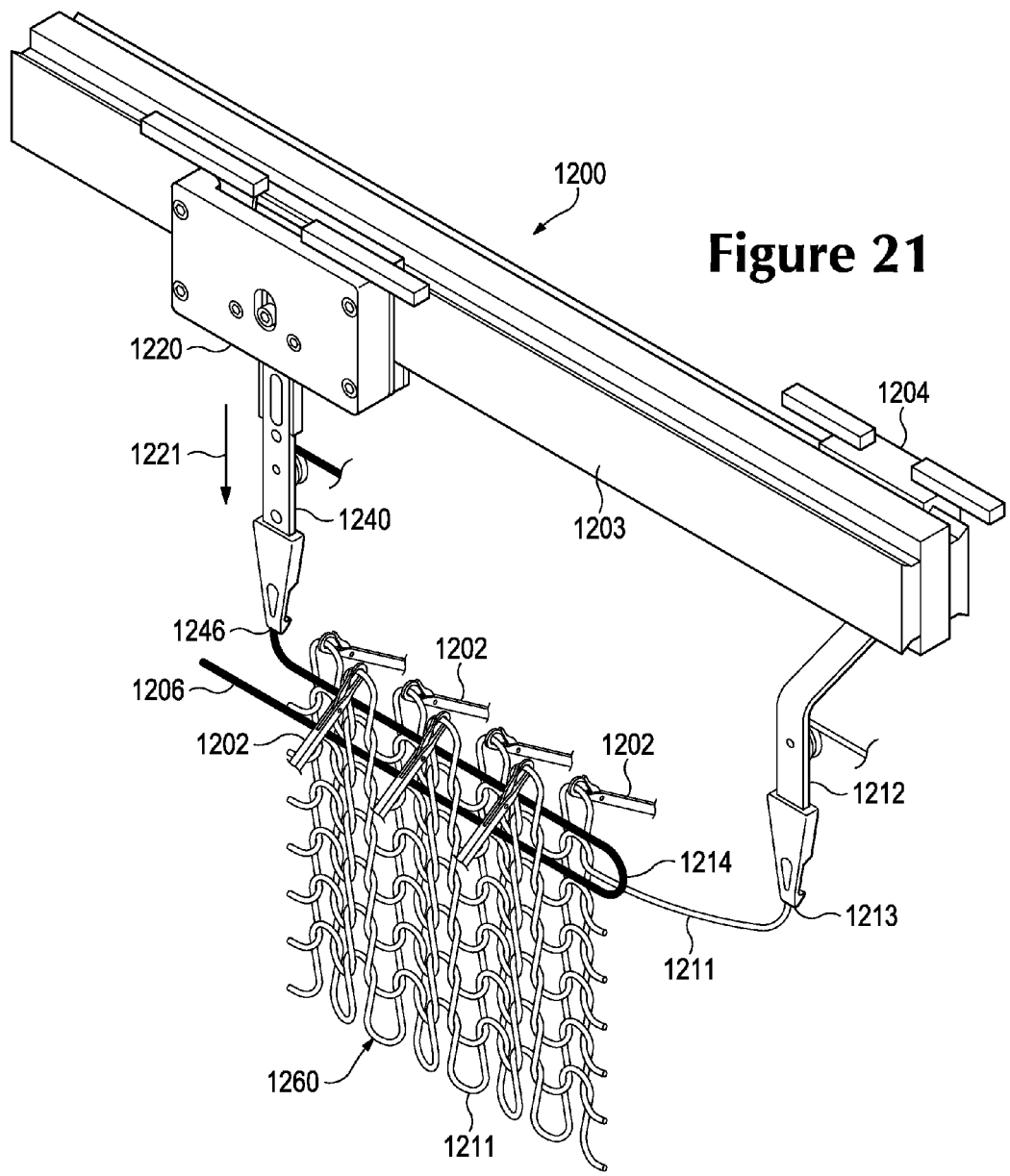
Figure 22:
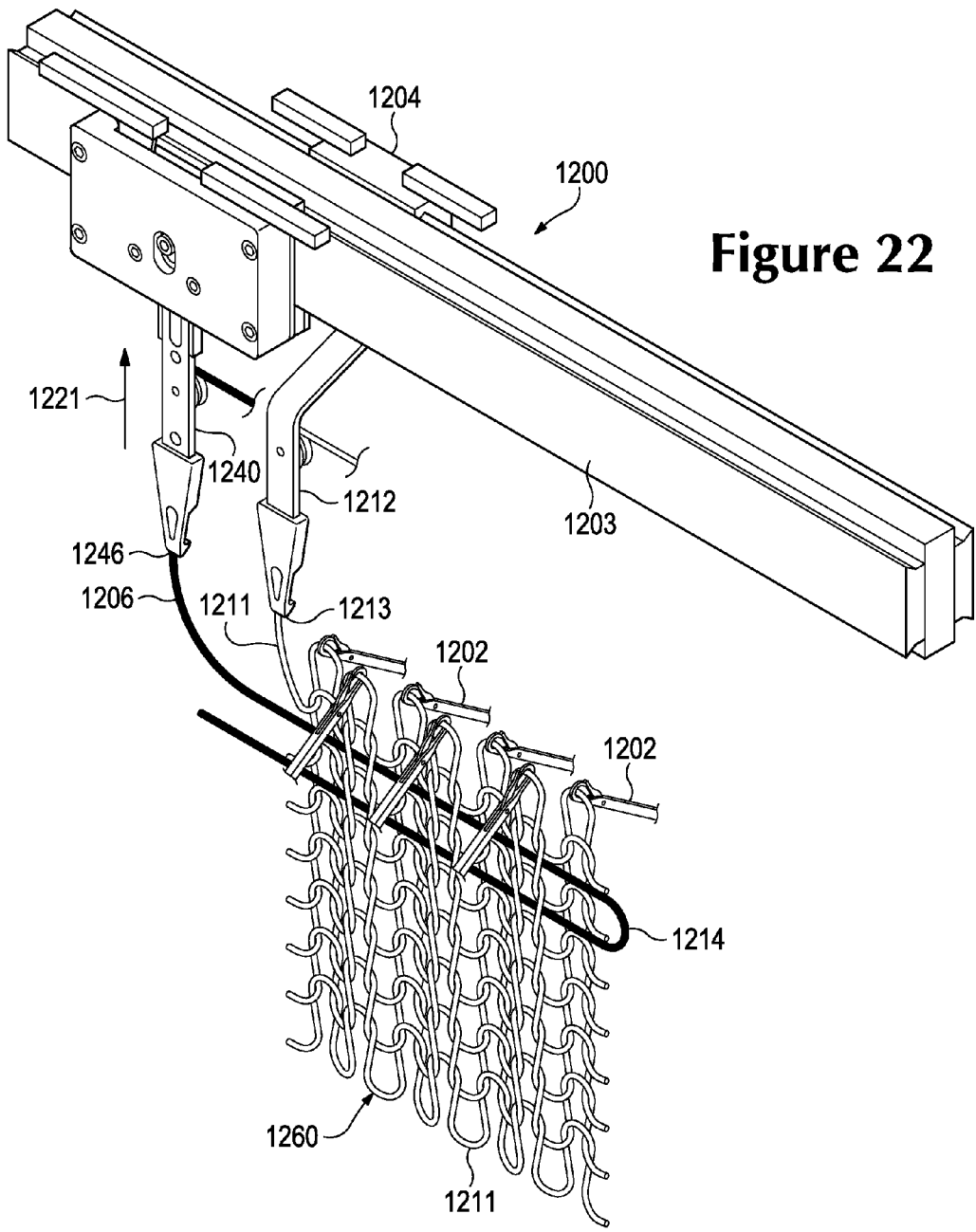

Continuing with the knitting process, feeder arm 1240 now translates from the retracted position to the extended position, as depicted in FIG. 20. Combination feeder 1220 then moves along rail 1203 and yarn 1206 is placed between loops of knitted component 1260, as depicted in FIG. 21. This effectively places yarn 1206 within the course formed by standard feeder 1204 in FIG. 19. In order to complete inlaying yarn 1206 into knitted component 1260, standard feeder 1204 moves along rail 1203 to form a new course from yarn 1211, as depicted in FIG. 22. By forming the new course, yarn 1206 is effectively knit within or otherwise integrated into the structure of knitted component 1260. At this stage, feeder arm 1240 may also translate from the extended position to the retracted position.

Referring to FIG. 22, yarn 1206 forms a loop 1214 between the two inlaid sections. In the discussion of the turns 159, 160 of FIGS. 1-6, it was noted that strand 158 exits the passage 162 and then enters another passage 162, thereby forming the turns 159, 160. Loop 1214 can be formed in a similar manner. That is, loop 1214 can be formed where yarn 1206 exits the knit structure of knitted component 1260 and then re-enters the knit structure.

Figure 23:
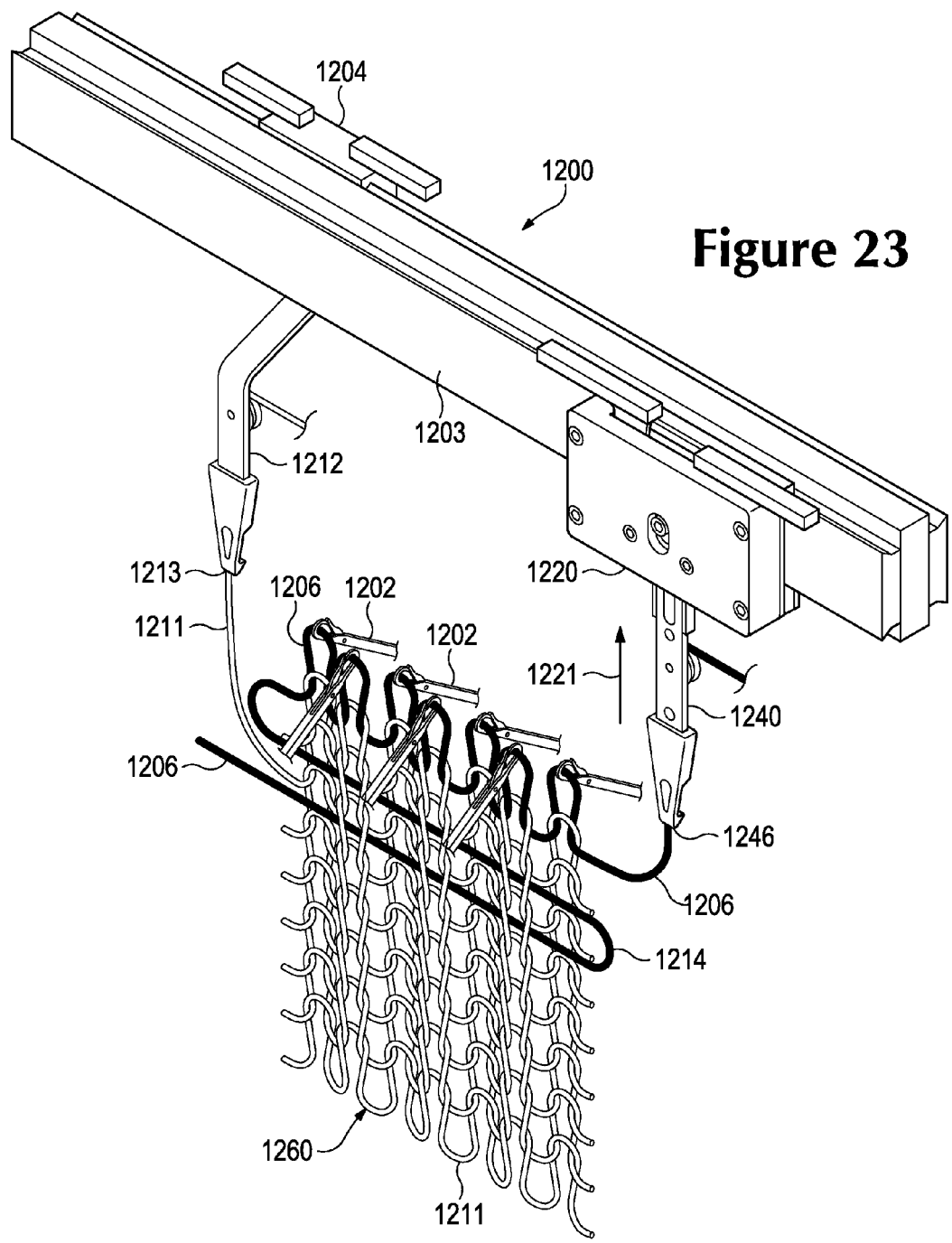

Referring to FIG. 23, combination feeder 1220 moves along rail 1203 while in the retracted position and forms a course of knitted component 1260 while in the retracted position. Accordingly, by reciprocating feeder arm 1240 between the retracted position and the extended position, combination feeder 1220 may supply yarn 1206 for purposes of knitting, tucking, floating, and inlaying.

The following discussion and accompanying figures disclose a variety of concepts relating to knitted components and the manufacture of knitted components. Although the knitted components may be utilized in a variety of products, an article of footwear that incorporates one of the knitted components is disclosed below as an example.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An upper for an article of footwear that is configured to be connected to a sole structure, the upper comprising:
   a knitted component having a medial portion, a lateral portion, and a baseportion, the base portion being configured to be disposed adjacent the sole structure, the medial and lateral portions disposed on opposite sides of the base portion, the knitted component including an interior surface and an exterior surface, the knitted component defining a plurality of side passages between the interior surface and the exterior surface of each of the medial and lateral portions; and
   a continuous tensile strand that extends through the side passages of the medial and lateral portions and along the base portion, the tensile strand alternating between and extending repeatedly between the medial portion and the lateral portion along the base portion in zigzag fashion;
   wherein the tensile strand includes a turn configured to receive a closure element that selectively secures the upper to the foot and the turn is embedded within the knitted component; and
   wherein the knitted component includes a heel portion and a forefoot portion, the heel and forefoot portions being disposed on opposite ends of the base portion, the tensile strand includes a first terminal end disposed nearer to the heel portion and a second terminal end disposed nearer to the forefoot portion, and the tensile strand, from the first terminal end to the second terminal end, extends repeatedly between the medial and lateral portions of the knitted component.

2. The upper of claim 1, wherein the base portion and at least one of the medial and lateral portions cooperate to define the interior surface and the exterior surface of the knitted component.

3. The upper of claim 2, wherein the base portion includes a base portion passage between the interior surface and the exterior surface;
   wherein the base portion passage and the at least one of the medial and lateral portions are in communication with each other such that the tensile strand is embedded within the base portion passage and the side passage as the strand extends continuously between the base portion passage and the side passage.

4. The upper of claim 1, wherein the tensile strand includes a turn configured to receive and support a closure element that selectively secures the upper to the foot.

5. The upper of claim 4, wherein the side portion includes an opening and the turn extends at least partially around the opening, the opening and the turn configured to cooperatively receive and support the closure element.

6. The upper of claim 2, wherein the medial portion, the lateral portion, and the base portion are formed of unitary knit construction.

7. The upper of claim 1, wherein the tensile strand is slidingly received within the passage.

8. The upper of claim 1, wherein the tensile strand is fixedly attached to the base portion.

9. The upper of claim 8, wherein the tensile strand is a fusible strand that is configured to be fused to the base portion.

10. The upper of claim 1, wherein the base portion includes an arch supporting region configured to extend under an arch of the foot, and wherein the tensile strand extends across the arch supporting region.

11. The upper of claim 1, wherein the tensile strand includes a portion that is exposed from the passage, wherein the portion extends along the base portion.

12. The upper of claim 11, wherein the portion of the tensile strand extends along the base portion, proximate the exterior surface of the knitted component.

13. The upper of claim 12, wherein the portion is configured to be attached directly to the sole structure.

14. The upper of claim 11, wherein the medial portion, the lateral portion, and the base portion cooperate to define the interior surface and the exterior surface.

15. An article of footwear comprising:
    a sole structure; and
    an upper that includes a knitted component, the knitted component including:
    a continuous tensile strand; and
    a knit element that includes:
    an interior surface;
    an exterior surface;
    a base portion that is layered over and attached to the sole structure;
    a side portion that extends away from the base portion and the sole structure;
    a plurality of passages defined between the interior surface and the exterior surface of the knit element, the passages including a part that extends through the side portion and a part that extends through part of the base portion, the base portion part of the passage being layered over and attached to the sole structure;

the side portion and the base portion formed of knit construction;

the tensile strand including a first portion received in the passages and a second portion that extends out from the passages and along part of the base portion, and the tensile strand alternating between and extending continuously between passages disposed in a medial portion of the side portion and passages disposed in a lateral portion of the side portion along the base portion;

wherein the tensile strand includes a turn configured to receive a closure element that selectively secures the upper to the foot and the turn is embedded within the knitted component; and wherein the knitted component includes a heel portion and a forefoot portion, the heel and forefoot portions being disposed on opposite ends of the base portion, the tensile strand includes a first terminal end disposed nearer to the heel portion and a second terminal end disposed nearer to the forefoot portion, and the tensile strand, from the first terminal end to the second terminal end, extends repeatedly between the medial and lateral portions of the knitted component.

16. The article of footwear of claim 15, wherein the second portion of the tensile strand is attached directly to the sole structure.

17. The article of footwear of claim 15, wherein the second portion of the tensile strand extends along the base portion, proximate the exterior surface.

18. The article of footwear of claim 15,
wherein the medial side portion, the base portion, and the lateral portion are formed of unitary knit construction.

* * * * *